United States Patent
Gerasimow et al.

(10) Patent No.: US 9,756,256 B2
(45) Date of Patent: Sep. 5, 2017

(54) SPATIALLY ADJUSTABLE FLASH FOR IMAGING DEVICES

(71) Applicant: Intel Corporation, Santa Clara, CA (US)

(72) Inventors: Timo Gerasimow, San Jose, CA (US); Tapio Finnila, Tampere, LS (FI); Lasse Lampinen, Tampere, LS (FI); Petteri Kyronlahti, Tampere, ES (FI)

(73) Assignee: Intel Corporation, Santa Clara, CA (US)

( * ) Notice: Subject to any disclaimer, the term of this patent is extended or adjusted under 35 U.S.C. 154(b) by 26 days.

(21) Appl. No.: 14/724,597

(22) Filed: May 28, 2015

(65) Prior Publication Data

US 2016/0352993 A1 Dec. 1, 2016

(51) Int. Cl.
| | |
|---|---|
| *H04N 5/235* | (2006.01) |
| *H04N 5/351* | (2011.01) |
| *H04N 5/225* | (2006.01) |
| *G03B 7/17* | (2014.01) |
| *G03B 15/05* | (2006.01) |

(52) U.S. Cl.
CPC ............ *H04N 5/2354* (2013.01); *G03B 7/17* (2015.01); *G03B 15/05* (2013.01); *H04N 5/2256* (2013.01); *H04N 5/2351* (2013.01); *H04N 5/351* (2013.01)

(58) Field of Classification Search
CPC .... H04N 5/2354; H04N 5/2351; H04N 5/351; H04N 5/2256; H04N 5/222; H04N 5/225; H04N 5/238; H04N 5/23219; H04N 9/04; H04N 9/735; G03B 17/02; G03B 7/16; G03B 7/17; G03B 15/02; G03B 15/05; G03B 15/03; G03B 2215/0589; H05B 33/0863; H05B 33/0869; F21V 23/04; F21V 23/0442; F21Y 2101/00; F21W 2131/406

USPC ........................................................ 348/371
See application file for complete search history.

(56) References Cited

U.S. PATENT DOCUMENTS

| | | | | |
|---|---|---|---|---|
| 6,069,659 | A * | 5/2000 | Nakajima ............ | H04N 5/2354 348/362 |
| 7,362,370 | B2 * | 4/2008 | Sakamoto ............ | H04N 5/2354 348/365 |
| 7,667,766 | B2 * | 2/2010 | Lee ........................ | G03B 15/02 348/370 |
| 7,995,911 | B2 * | 8/2011 | Butterworth ............. | G03B 7/08 396/155 |
| 8,064,647 | B2 * | 11/2011 | Bazakos ............ | G06K 9/00261 382/117 |
| 8,090,246 | B2 * | 1/2012 | Jelinek ............... | G06K 9/00604 348/296 |
| 8,218,963 | B2 * | 7/2012 | Adelsberger ........... | G03B 15/03 362/16 |
| 8,483,557 | B1 * | 7/2013 | Yost ...................... | H04N 5/222 348/370 |

(Continued)

*Primary Examiner* — Pritham Prabhakher
(74) *Attorney, Agent, or Firm* — Green, Howard & Mughal LLP

(57) ABSTRACT

Techniques related to spatially adjustable flash exposures for imaging devices are discussed. Such techniques may include adjusting region transparencies of a flash filter panel adjacent to a flash module of the image device based on flash filter panel control parameters and exposing the scene by providing a flash light from the flash module and through the flash filter control panel.

21 Claims, 9 Drawing Sheets

(56) References Cited

U.S. PATENT DOCUMENTS

| | | | | |
|---|---|---|---|---|
| 8,705,808 B2* | 4/2014 | Determan | G06K 9/00255 | 382/115 |
| 8,953,095 B2* | 2/2015 | Liaw | G03B 7/16 | 348/258 |
| 8,964,089 B2* | 2/2015 | Imai | G06T 5/50 | 348/220.1 |
| 9,338,849 B2* | 5/2016 | Logiudice | H05B 33/0845 | |
| 9,503,654 B2* | 11/2016 | Kaikumaa | G03B 13/36 | |
| 2003/0137597 A1* | 7/2003 | Sakamoto | H04N 5/2354 | 348/371 |
| 2005/0134723 A1* | 6/2005 | Lee | G03B 15/02 | 348/370 |
| 2005/0157204 A1* | 7/2005 | Marks | H04N 5/272 | 348/370 |
| 2007/0157204 A1* | 7/2007 | Leymann | G06F 9/526 | 718/100 |
| 2008/0199172 A1* | 8/2008 | Hamada | G03B 7/16 | 396/157 |
| 2009/0160944 A1* | 6/2009 | Trevelyan | H04N 5/2354 | 348/187 |
| 2010/0033588 A1* | 2/2010 | Thorn | H04N 5/2354 | 348/222.1 |
| 2010/0124041 A1* | 5/2010 | Druchinin | G03B 11/00 | 362/16 |
| 2010/0165178 A1* | 7/2010 | Chou | H04N 5/2354 | 348/371 |
| 2010/0238344 A1* | 9/2010 | Tsai | G06F 3/0488 | 348/361 |
| 2010/0253797 A1* | 10/2010 | Arshavski | H04N 5/23293 | 348/222.1 |
| 2010/0283870 A1* | 11/2010 | Kleihorst | G03B 7/16 | 348/234 |
| 2011/0123183 A1* | 5/2011 | Adelsberger | G03B 15/03 | 396/164 |
| 2011/0157895 A1* | 6/2011 | Alenius | G03B 15/02 | 362/293 |
| 2012/0154627 A1* | 6/2012 | Rivard | G03B 15/02 | 348/224.1 |
| 2012/0274775 A1* | 11/2012 | Reiffel | G06Q 30/08 | 348/158 |
| 2013/0195435 A1* | 8/2013 | Yost | H04N 5/222 | 396/164 |
| 2013/0300894 A1* | 11/2013 | Imai | G06T 5/50 | 348/229.1 |
| 2014/0168466 A1* | 6/2014 | Yoshida | H04N 9/735 | 348/224.1 |
| 2015/0220772 A1* | 8/2015 | Mil'shtein | G06K 9/00919 | 382/118 |
| 2015/0227025 A1* | 8/2015 | Park | G03B 15/05 | 348/224.1 |

\* cited by examiner

SPATIALLY ADJUSTABLE FLASH FOR IMAGING DEVICES

BACKGROUND

Obtaining images via cameras or cameras integrated within devices such as mobile phones or tablets or the like is very common. In some conditions such as low light exposure conditions, the imaging device (e.g., a camera or a device having an integrated camera) may implement a flash in an attempt to properly expose the scene. For example, the imaging device may implement a global flash (e.g., a flash light) during exposure. However, when subjects of the scene are at different distances from the flash, some subjects may be overexposed or underexposed. For example, if a first subject is close to the flash and a second subject is farther from the flash, properly exposing the second subject may cause overexposure of the first subject (e.g., the first subject being too bright) and properly exposing the first subject may cause underexposure of the second subject (e.g., the second subject being too dark). For example, a global flash may illuminate subjects according to the inverse-square law such that flash intensity at a distance from the flash is proportional to the inverse square of the distance (e.g., flash intensity=1/distance$^2$). In such situations, a single exposure using a global flash may provide low quality images.

Current techniques may attempt to overcome such difficulties using high-dynamic-range imaging (HDR) and underexposure and local contrast enhancement. For example, HDR imaging may include taking multiple images of the scene with different exposure settings and combining the resultant images. However, the use of such multiple images may introduce problems such as blurring, ghosting effects, and the requirement that the scene remain unchanged while the multiple images are obtained. Furthermore, HDR imaging may not work in video capture mode at high frame rates (e.g., if the time between video frames is less than the time needed to obtain the multiple images) and HDR imaging may be computationally intensive and therefore not suitable for low-power devices.

In underexposure and local contrast enhancement techniques, the scene may be underexposed such that none of the subjects are overexposed (e.g., overexposed to saturation) and local contrast enhancement techniques may be used to brighten any underexposed subjects. However, such techniques may increase image noise in the enhanced image areas and/or create unsatisfactory image results due to very low signal levels representing the underexposed (e.g., dark) subjects in the original (e.g., captured) image data. For example, the underexposed subjects may not be able to be suitably represented based on local contrast enhancement techniques.

As such, existing techniques do not provide suitable exposure for subjects in a scene that are at different distances from the global flash. Furthermore, techniques for overcoming such difficulties may be impracticable and/or may provide low quality and unnatural looking images. It is with respect to these and other considerations that the present improvements have been needed. Such improvements may become critical as the desire to obtain aesthetically pleasing images in a variety of contexts becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
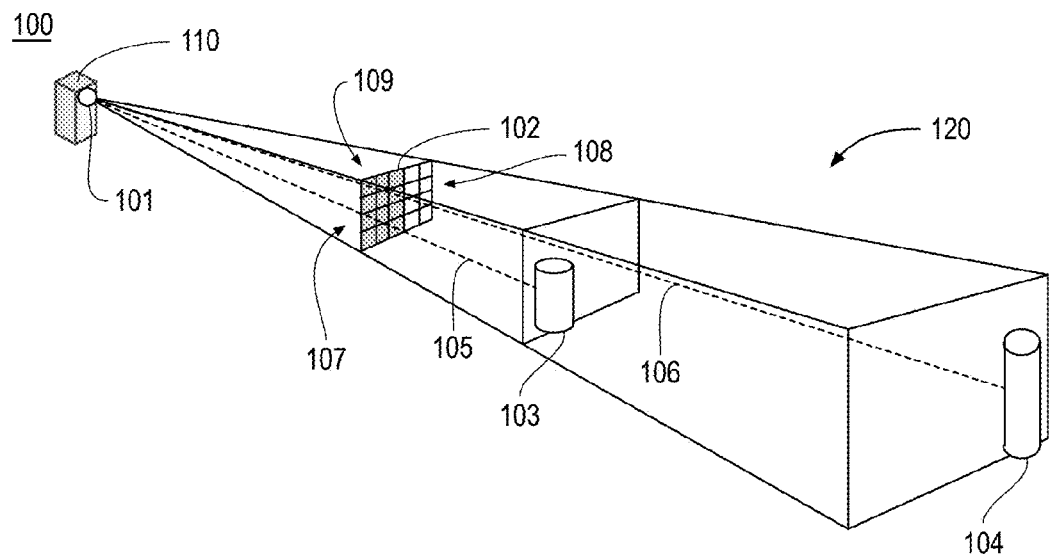
FIG. 1 is an illustrative diagram of an example exposure setting for providing spatially adjusted flash exposures.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as cameras, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, systems, and articles are described herein related to providing spatially adjusted flash exposures for imaging devices and, in particular, for adjusting transparencies of regions of a flash filter panel as a flash light is provided to expose of a scene.

As described above, obtaining images via imaging devices (e.g., cameras or cameras integrated within devices such as smartphones or the like) may be common. In some instances, the imaging device may obtain an image using a flash light from a flash or a flash module or the like. In such instances, it may be difficult to properly expose near subjects and distant subjects simultaneously. For example, if the near subject is properly exposed a distance subject may be underexposed or, if the distant subject is properly exposed, a near subject may be overexposed. In such examples, the resulting images may be of poor quality.

In some embodiments discussed herein, providing for spatially adjusted flash exposures for imaging devices may include determining flash filter panel control parameters based on image data associated with a scene. The flash filter panel control parameters may control a flash filter panel having multiple transparency adjustable (e.g., dimmable) regions. The regions may be individually controllable or they may include controllable sub-regions or pixels or the like. The flash filter panel may be grayscale such that the intensity of flash provided to the scene may be spatially controlled or the flash filter panel may be color such that the intensity of flash and/or the relative color of the flash may be spatially controlled. For example, the flash filter panel control parameters may be generated based on image data attained before the final exposure such as luminance or brightness data obtained during a pre-flash operation, depth data, object detection data, or the like. In other examples, the flash filter panel control parameters may be preset or controlled via the user or an application running on the imaging device or the like.

Based on the flash filter panel control parameters, the flash filter panel may be controlled such that certain regions are transparency adjusted (e.g., dimmed and/or color adjusted) during an exposure performed by the imaging device that implements a flash. Such adjustments may provide flash light brightness, illumination, or intensity control for exposure of the scene. For example, the imaging device may include the flash filter panel having multiple transparency adjustable regions (e.g., grayscale or color adjustable regions) and a controller coupled to the flash filter panel to adjust the transparencies of the transparency adjustable regions based on flash filter panel control parameters. In some examples, the flash filter panel may be an integrated module or portion of the imaging device. In such examples, the flash filter panel may be disposed between the flash module and a flash module lens or adjacent to the flash module lens, which may be adjacent to the flash module. In other examples, the flash filter panel may be a detachable module or unit. In such examples, the flash filter panel may be disposed adjacent to the flash module lens, which may be adjacent to the flash module. Furthermore, in such examples, a cover lens such as a cover glass or the like may be provided over the flash filter panel to protect it during use.

Using such techniques and/or devices, the attained image may be captured without undesirable overexposure or underexposure and/or with enhanced color adjustment or color balancing. For example, the spatially controlled flash exposure (e.g., flash intensity control over the spatial dimensions of the scene) may provide for proper exposure lighting and/or settings for all or most subjects of the scene. Furthermore, in color flash filter panel examples, desirable color traits may be spatially controlled (e.g., the color and intensity of light provided to the scene may be controlled over the spatial dimensions of the scene). Such techniques may provide desirable image qualities such as better color balance for portions of the scene illuminated by different ambient light sources, additional red tones or the like in skin regions of the scene (e.g., for a person or persons in the scene), improved color balance, improved flash light color, or the like. The images attained using such techniques may be further processed and/or used for any suitable purpose.

For example, the techniques discussed herein may mitigate or solve exposure difficulties caused by the illumination inverse-square law by achieving spatial controllability of flash intensity by placing a flash filter panel or film or the like in front of the flash module of an imaging device. The flash filter panel may be integrated into the flash module or provided separately from the flash module as a stand-alone device.

FIG. 1 is an illustrative diagram of an example exposure setting 100 for providing spatially adjusted flash exposures, arranged in accordance with at least some implementations of the present disclosure. As shown in FIG. 1, exposure setting 100 may include an imaging device 110 using a flash 101 to attain an image of a scene 120 including a subject 103 and a subject 104. For example, imaging device 110 may include a flash filter panel 102 or flash filter panel 102 may be provided outside of imaging device 110 to spatially adjust the intensity and/or color of light provided to scene 120 via flash 101. In the illustration of FIG. 1, flash filter panel 102 is illustrated separated from flash 101 and imaging device 110 for the sake of clarity of explanation. However, as discussed elsewhere herein and, in particular, with respect to FIGS. 7A and 7B, flash filter panel 102 may be provided adjacent to flash 101 (e.g., either immediately adjacent or with one or more components such as a flash module lens therebetween) to adjust the flash light provided to scene 120.

Figure 3:
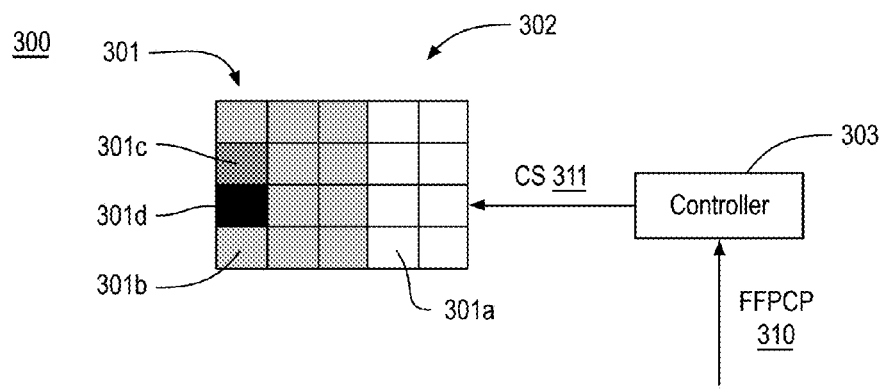
FIG. 3 illustrates an example device for providing spatially adjusted flash exposures.
Figure 4:
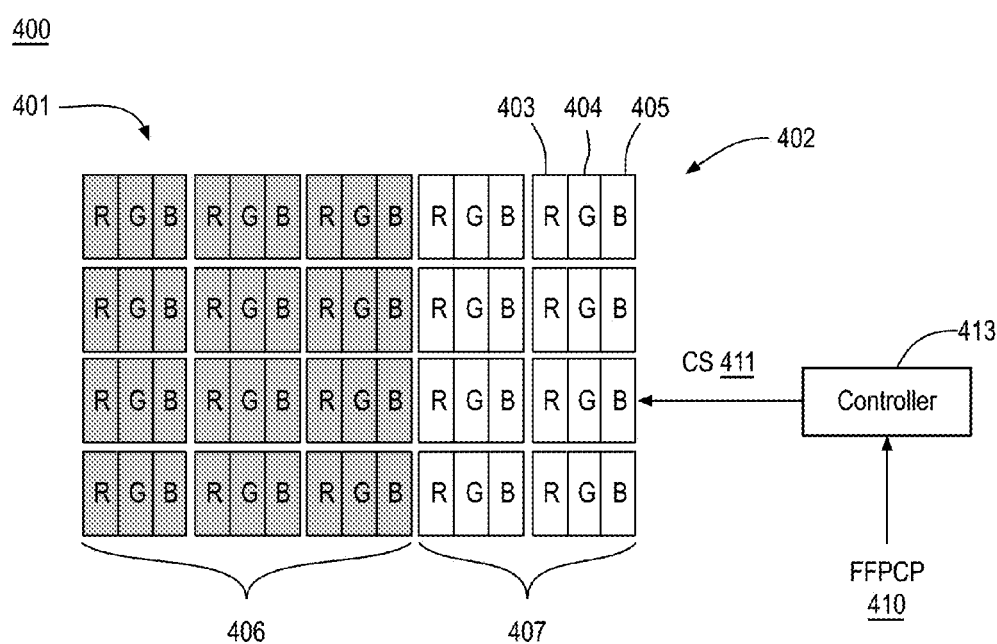
FIG. 4 illustrates an example device for providing spatially adjusted flash exposures having color control.
Figure 6:
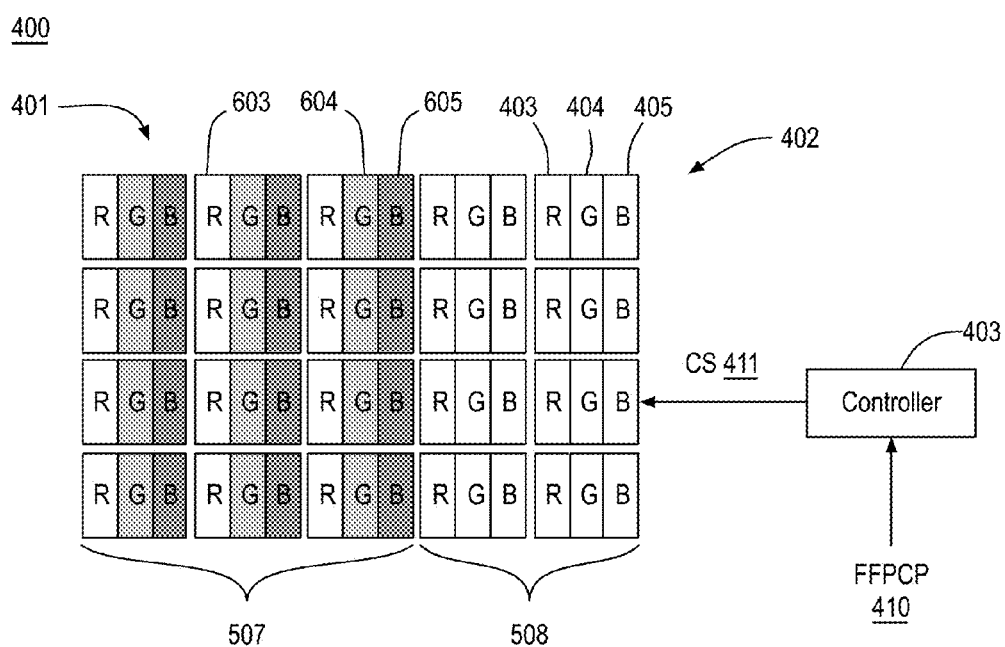
FIG. 6 illustrates an example device for providing spatially adjusted flash exposures having color control.

As discussed further herein, flash filter panel 102 may be a grayscale flash filter panel (as discussed further with respect to grayscale flash filter panel 302 of FIG. 3) or a color flash filter panel (as discussed further with respect to color filter flash panel 402 of FIGS. 4 and 6).

Imaging device 110 may include any suitable imaging device having a flash capability and/or an ability to trigger flash 101. For example, imaging device 110 may be a camera, a smartphone, an ultrabook, a laptop, a tablet, or the like. Scene 120 may be any suitable scene including any number of subjects or regions or the like such as subject 103 and subject 104. In the example of FIG. 1, subject 103 is in a foreground of scene 120 and a distance 105 from flash 101 and imaging device 110 and subject 104 is in a background or midground of scene 120 and a distance 106 from flash 101 and imaging device 110. However, scene 120 may include any number of subjects, regions, objects, or the like. Furthermore, such subjects may be at any distance from imaging device 110.

Figure 2:
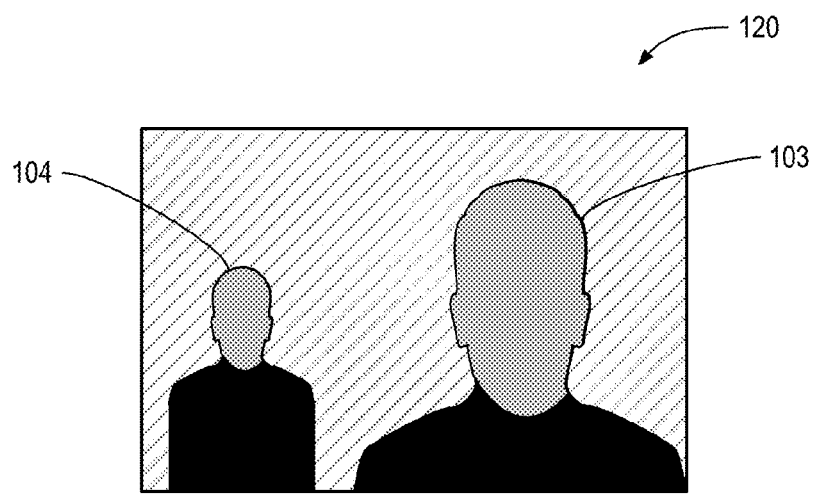
FIG. 2 illustrates an example scene from a vantage point of an imaging device.

FIG. 2 illustrates an example scene 120 from a vantage point of imaging device 110, arranged in accordance with at least some implementations of the present disclosure. As shown, subject 103 may be in a foreground of scene 120 and subject 104 may be in a background or midground of scene 120. For example, as discussed, without the spatially adjusted flash control discussed herein, in low light conditions, imaging device 110 may trigger flash 101 such that either subject 103 or subject 104 is properly illuminated for exposure. However, if subject 103 is properly illuminated for exposure, the corresponding flash light may leave subject 104 underexposed (e.g., substantially dark) and, if subject 104 is properly illuminated for exposure, the corresponding flash light may leave subject 103 overexposed (e.g., substantially bright) and, in some conditions, overexposed to the point of saturation.

Returning to FIG. 1, as shown with respect to transparency reduced region 107 and fully transparent region 108, flash filter panel 102 may spatially control the flash light provided via flash 101 to scene 120 to attain a proper exposure via pixels 109 (e.g., transparency adjustable regions) of flash filter panel 102. Transparency reduced region 107 may include any number of pixels 109 such as one or more pixels. Similarly, fully transparent region 108 may include any number of pixels 109 such as one or more pixels. In the example of FIG. 1, each of pixels 109 of transparency reduced region 107 have the same transparency reduction. However, in other examples, pixels 109 of transparency reduced region 107 may have different transparency reductions. As is discussed herein, flash filter panel 102 may have any suitable number of pixels 109. Pixels 109 may also be characterized as regions, sub-regions, transparency adjustable regions, or the like. Furthermore, in some examples, pixels 109 may be color pixels such that the transparency of regions of flash filter panel 102 may be controlled to adjust the color of the light provided via flash 101 to scene 120, as is discussed further herein. As discussed herein, the term transparency or transparency reduced may include grayscale transparency or transparency reduction or color transparency or transparency reduction.

In the example of FIG. 1, scene 120 includes two subjects and two associated regions: subject 103 and subject 104 and transparency reduced region 107 and fully transparent region 108, respectively. However, scene 120 may include any number of subjects and/or any number of associated regions such as one subject or three or more subjects and/or one region or three or more regions. For example, the number of regions may only be limited by the number of pixels 109 of flash filter panel 102 (e.g., three may be 1 to n regions, where n is the number of pixels 109). Furthermore, a region of flash filter panel may include any number of pixels 109 and such a region may be associated with any number of subjects or no subjects of scene 120.

As discussed, flash filter panel 102 may spatially control flash light to properly illuminate scene 120 during exposure. For example, as shown via transparency reduced region 107 and fully transparent region 108, the flash light provided to subject 103 may be reduced with respect to the flash light provided to subject 104. As shown in FIG. 1, subject 104 may be at a distance 106 from imaging device 110 and subject 103 may be at a distance 105 from imaging device 110. For example, as distance 106 is greater than distance 105, the flash light provided to subject 104 may be advantageously provided via fully transparent region 108 such that pixels 109 of fully transparent region 108 are at positions in flash filter panel 102 associated with subject 104. For example, a most distant subject in scene 120 may be provided with flash light via a fully transparent region such as fully transparent region 108.

Furthermore, as shown, the flash light provided to subject 103 may be reduced via adjusting the transparency of transparency reduced region 107 such that pixels 109 of flash filter panel 102 associated with subject 103 may have a reduced flash light during exposure. Such spatial adjustment of the intensity of the provided flash light via flash filter panel 102 may provide a proper exposure of scene 120. For example, with reference to FIG. 2, subject 104 and subject 103 may both be properly exposed in a single exposure using a flash light spatially adjusted to provide proper illumination of subject 103 and subject 104.

As discussed, in the illustrated example, all pixels 109 of transparency reduced region 107 have the same transparency adjustment, transparency reduction, or dimming. In other examples, different transparency adjustments, transparency reductions, or dimming pixels 109 of transparency reduced region 107 may be provided among transparency reduced region 107. Furthermore, in the illustrated example, pixels 109 of fully transparent region 108 associated with subject 104 are not transparency adjusted, transparency reduced, or dimmed or the like. However, in other examples, some or all of pixels 109 fully transparent region 108 may instead by slightly dimmed in order to control the flash light provided via flash 101. As discussed, the dimming of transparency reduced regions in comparison to the flash provided via fully transparent region 108 may spatially control the flash light provided to subject 103.

The transparency reduction of pixels 109 in transparency reduced region 107 may be determined using any technique or techniques. For example, a pre-flash sequence may be provided to generate a brightness image, intensity image, luminance data, or the like representative of scene 120. Such an image or data may be used to determine a brightness or luminance or the like associated with subject 104 and a brightness or luminance or the like associated with subject 103. In some examples, the intensity of flash 101 for implementation during exposure and image capture of the final image of scene 120 may be determined based on providing an optimal exposure of subject 104 (e.g., a subject at a greatest distance from imaging device 110) and the transparency reduction of pixels 109 in transparency reduced region 107 may be determined to provide an optimal exposure of subject 104. In some examples, the transparency reduction of pixels 109 in transparency reduced region 107 may be the ratio of the brightness of subject 104 over the brightness of subject 103 determined during a pre-flash sequence. For example, if the pre-flash measured brightness of subject 103 is 10 times the pre-flash measured brightness of subject 104, the desired brightness of the flash light associated with subject 103 during final image capture may be 10% of the brightness of the flash light associated with subject 104. Such a brightness ratio may be provided by allowing 10% of the flash light transmitted via fully transparent region 108 to be transmitted via transparency reduced region 107 by reducing the transparency of transparency reduced region 107 by 90% or the like.

In other examples, the transparency reduction of transparency reduced region 107 may be determined based on distance 106 to subject 104 and distance 105 to subject 103. Such distances may be determined using any suitable technique or techniques such as range finding techniques, depth mapping or the like. For example, during pre-exposure processing, depth data or a depth map or the like associated with scene 120 may be generated. The depth data or depth map may include information associated with the distance of subject 103, subject 104, and other elements of scene 120 from a viewpoint (e.g., from imaging device 110, from an approximated focal plane, or the like). Such depth data and location data (e.g., providing locations of elements of scene 120 across an image plane) may be used to provide transparency control for regions of flash filter panel 102. For example, distance 106 and distance 105 may be generated using such depth map data. Furthermore, regions and/or pixels 109 of flash filter panel 102 may be associated with such subjects of scene 120. In other examples, distance 106 and distance 105 may be determined using other techniques such as autofocus techniques, range finding techniques, or the like.

In such examples where distance 106 and distance 105 are determined, transparencies of regions and/or pixels 109 of flash filter panel 102 may be provided (e.g., provided during a final exposure of scene 120) based on the distances to subjects in scene 120. For example, since distance 106 as associated with subject 104 is a greatest subject distance of scene 120 (e.g., other distances in scene 120 are at a background or presumed infinite distance or the like), the flash light provided via flash 101 may be based on distance 106 such that other regions (e.g., transparency reduced region 107) of flash filter panel 102 may be adjusted based on the flash light provided for subject 104 and their distance relative to distance 106. The flash light to a nearer subject may be reduced by a square of a ratio of the distance to the nearer subject to the distance to the more distant subject. For example, if distance 105 is $d_1$ and distance 106 is $d_2$ such that $d_2=3d_1$, the flash the desired brightness of the flash light associated with subject 103 during final image capture may be $(d_1/d_2)^2=(1/3)^2=11.1\%$ of the brightness of the flash light associated with subject 104. Such a brightness ratio may be provided by allowing 11.1% of the flash light transmitted via fully transparent region 108 to be transmitted via transparency reduced region 107 by reducing the transparency of transparency reduced region 107 by 88.9% (e.g., about 90%) or the like.

As discussed, flash filter panel 102 may provide spatially adjusted flash exposures. Such spatial adjustments may provide spatially adjusted flash light brightness to different subjects of a scene and/or spatially adjusted flash light color to different subjects of a scene. For example, as is discussed further with respect to FIG. 4, flash filter panel 102 may have color pixels that may be controlled to adjust flash light color to different subjects of a scene. For example, regions of flash filter panel 102 may provide different light colors to different regions of scene 120 to provide color balance for scene 120 or the like. In some examples, for regions of flash filter panel 102 associated with detected skin regions of a scene, more red flash light may be provided to enhance imaging of skin tones. In other examples, particularly when light-emitting diode based flashes are implemented, flash filter panel 102 may be used to provide red flash light throughout a scene or to foreground portions of a scene or the like as, in some implementations, flash light may be tinted toward blue or green tones.

With reference to FIG. 1, flash filter panel 102 may include any number of pixels 109 such as 20 pixels as illustrated, 2 to 4 pixels, 20 to 50 pixels, 50 to 100 pixels, 100 to 1000 pixels, or more. Furthermore, in color flash filter panel examples, a single pixel may be provided that may adjust the flash color globally. As used herein the term region is meant to indicate a controllable region of flash filter panel 102 or any other region of flash filter panel 102. For example, a region may be made up of sub-regions or pixels or the like that may be independently controlled to define a region. In some examples, a region may be one pixel or any number of pixels. A region may have any shape such as square, rectangular, circular, or the like. Furthermore, increasing the number of pixels 109 may enhance the resolution of the spatially adjusted flash light provided to scene 120. However, such enhanced resolution may not be critical in some contexts. Also, as discussed, flash filter panel 102 may be a grayscale panel capable of providing only flash light illumination control or flash filter panel 102 may be a color panel capable of providing flash light illumination control and flash light color control. Flash filter panel 102 may including any suitable panel capable of providing such control such as liquid-crystal display panels or the like. Furthermore, the illumination and/or color flash light control discussed herein may be actively or dynamically controlled such that the control is based on scene 120. Such techniques may be provided based on image data attained based on scene 120 prior to the final scene exposure is taken. For example, the image data may be brightness image data attained via pre-flash sequence or depth data attained via a pre-exposure sequence or the like.

FIG. 3 illustrates an example device 300 for providing spatially adjusted flash exposures, arranged in accordance with at least some implementations of the present disclosure. As shown, device 300 may include a grayscale flash filter panel 302 and a controller 303. For example, grayscale flash filter panel 302 may provide flash light brightness, illumination, or intensity control as discussed herein. As shown, grayscale flash filter panel 302 may include pixels 301 including example pixels 301a, 301b, 301c, 301d. As shown, pixels 301 may be controlled via controller to vary the transparencies of such pixels. In some contexts, pixels 301 may be characterized as sub-regions or the like. As discussed, one or more pixels 301 may provide a region of flash filter panel 102. Also as shown, grayscale flash filter panel 302 may operate under the control of a control signal 311 provided via a controller 303. For example, controller 303 may generate control signal 311 based on flash filter panel control parameters 310. Flash filter panel control parameters 310 may be received from any other module or circuitry of device 300 such as an image processor or the like. For example, flash filter panel control parameters 310 may define transparency parameters for implementation via grayscale flash filter panel 302, output brightness ratios (e.g., brightness percentages for pixels 301 or regions of grayscale flash filter panel 302 based on full brightness such as a full brightness provided via a flash module) for implementation via grayscale flash filter panel 302, dimming ratios (e.g., transparency reductions for pixels 301 or regions of grayscale flash filter panel 302 based on a full transparency such as a full transparency default for pixels 301), or the like. In some examples, flash filter panel control parameters 310 may be provided in a coordinate system or domain associated with grayscale flash filter panel 302 and, in other examples, flash filter panel control parameters 310 may be provided in a coordinate system or domain associated with an image plane.

Controller 303 may translate flash filter panel control parameters 310 to control signal 311 to control grayscale flash filter panel 302 during an exposure. For example, the exposure may be performed by an imaging device within which device 300 is integrated or by an imaging device separate from device 300. For example, device 300 may be provided separately from the image device but coupled to and controlled by the imaging device via flash filter panel control parameters 310 or a similar interface protocol.

Grayscale flash filter panel 302 may include any suitable filter panel such as a grayscale LCD or the like. For example, grayscale flash filter panel 302 may include pixels 301 that may be dimmable or transparency adjustable or the like. As shown, in some examples, grayscale flash filter panel 302 may provide a range of transparencies ranging from a full transparency (e.g., fully transparent) as shown with respect to pixel 301a and fully opaque (e.g., blacked out or the like) as shown via pixel 301d. As used herein, fully transparent may include a fully open condition for pixel 301a and is not meant to indicate all light provided to pixel 301a may traverse pixel 301a. For example, some light may be blocked or scattered even when pixel 301a is in such a fully transparent or fully open state. Similarly, fully opaque or blacked out pixel 301d may allow some light to pass through even when in the blacked out state.

Grayscale flash filter panel 302 may provide any number of intermediate states between fully transparent and fully blacked out. For example, as shown, pixel 301b may be more transparent with respect to pixel 301c. In some examples, grayscale flash filter panel 302 may provide 256 states for each of pixels 301 (e.g., coded from 0 to 255) such that 0 (or 255) is fully transparent and 255 (or 0) is blacked out and intermediate values are linearly provided transparencies. In other examples, 4, 8, or 16 or the like states may be provided via grayscale flash filter panel 302. As discussed, grayscale flash filter panel 302 may be controlled via control signal 311. For example, control signal 311 may provide a transparency parameter, a transparency value, or the like for each of pixels 301 to be implemented by grayscale flash filter panel 302 such as during an exposure or the like. In some examples, grayscale flash filter panel 302 may default to a state of all pixels 301 being fully transparent. Such a default may provide a known default for the associated imaging device as well as fully transparent operation for pre-flash procedures or the like.

FIG. 4 illustrates an example device 400 for providing spatially adjusted flash exposures having color control, arranged in accordance with at least some implementations of the present disclosure. As shown, device 400 may include a color flash filter panel 402 and a controller 413. For example, color flash filter panel 402 may provide flash light brightness, illumination, or intensity control and/or flash light color control as discussed herein. As shown, color flash filter panel 402 may include color pixels 401 including color sub-pixels 403, 404, 405. For example, color pixels 401 may include red sub-pixels 403, green sub-pixels 404, and blue sub-pixels 405. In the example of FIG. 4, an red green blue (RGB) flash filter panel is illustrated. However, color flash filter panel 402 may implement any suitable color space or scheme having any suitable pattern.

Furthermore, color flash filter panel 402 may operate under the control of a control signal 411 provided via a controller 413. For example, controller 413 may generate control signal 411 based on flash filter panel control parameters 410. Flash filter panel control parameters 410 may be received from another module or circuitry of device 400 such as an image processor or the like. For example, flash filter panel control parameters 410 may define brightness and/or color transparency parameters for implementation via color flash filter panel 402, output brightness and/or color ratios (e.g., brightness percentages for color pixels 401 based on full brightness such as a full brightness provided via a flash module and/or color tint ratios) for implementation via color flash filter panel 402, dimming ratios (e.g., transparency reductions for color pixels 401 based on a full transparency such as a full transparency default for color pixels 401), or the like. For example, controller 413 may translate flash filter panel control parameters 410 to control signal 411 to control color flash filter panel 402 during an exposure via an imaging device within which device 400 is integrated or by an imaging device separate from device 400. For example, device 400 may be provided separately from the image device but coupled to and controlled by the imaging device via flash filter panel control parameters 410 or a similar interface protocol. In some examples, flash filter panel control parameters 410 may be provided in a coordinate space or domain based on color flash filter panel 402 and, in other examples, flash filter panel control parameters 410 may be provided in a coordinate space or domain based on an image plane.

Color flash filter panel 402 may include any suitable filter panel such as a color LCD or the like. For example, color flash filter panel 402 may include color pixels 401 that may be dimmable or transparency adjustable and color adjustable. Color flash filter panel 402 may provide a range of transparencies and colors. For example, color pixels 401 of color filter panel 402 may range from fully transparent to fully opaque and color pixels 401 may range over a color gamut. For examples, color pixels 401 may have sub-pixels 403-405 set to the same color transparences to provide white or dimmed white light or color pixels may have sub-pixels 403-405 set to different color transparencies to provide any color within the color gamut of color filter panel.

Color flash filter panel 402 may provide any number of intermediate states (e.g., color transparencies) between fully transparent and fully blacked out. In some examples, color flash filter panel 402 may provide 256 states for each of sub-pixels 403-405 (e.g., coded from 0 to 255) such that 0 (or 255) is fully transparent and 255 (or 0) is blacked out and intermediate values are linearly provided color transparencies. In other examples, 4, 8, or 16 or the like states may be provided for sub-pixels 403-405 of color flash filter panel 402. As discussed, color flash filter panel 402 may be controlled via control signal 411. For example, control signal 411 may provide a transparency parameter, a transparency value, or the like for each of sub-pixels 403-405 to be implemented by color flash filter panel 402 such as during an exposure or the like. In some examples, color flash filter panel 402 may default to a state of all color pixels 401 being fully transparent. Such a default may provide a known default for the associated imaging device as well as fully transparent operation for pre-flash procedures or the like.

As discussed, color flash filter panel 402 may provide flash light brightness, illumination, or intensity control and/ or flash light color control during a flash exposure. For example, to provide flash light brightness, illumination, or intensity control, all sub-pixels such as those illustrated in regions 406 and 407 may be controlled at the same transparency adjustment. In the illustrated example, region 407 is shown as fully transparent (e.g., such that sub-pixels of color pixels 401 in region 407 are fully transparent). For example, full transparency implemented via red, green, and blue sub-pixels of region 407 may provide the color of light provided via the flash (e.g., typically white light or light that is close to white light). For example, to provide flash light brightness, illumination, or intensity control between region 407 and region 406, all of the sub-pixels of color pixels 401 in region 406 may be dimmed or transparency adjusted by the same amount as shown such that spatially adjusted brightness control is provided without spatially adjusted color control.

However, as also discussed herein, in some examples, a color of light for a region or regions may be modified to provide spatially adjusted colored light to various subjects, regions, or portions of a scene. For example, such color adjustment may provide enhanced flash light for skin regions of a scene (e.g., tinted light for people in the scene), color balance for a scene, or the like. For example, color flash filter panel 402 provided in front a flash module may allow the color of the flash to be adjusted to any color within the gamut of the color filter panel 402. Furthermore, as discussed, color flash filter panel 402 may provide spatial control of such color provision to a scene such that different spatial areas, regions, objects, subjects, or the like of the scene may be provided by any chromaticity within the gamut of color flash filter panel 402 during the same exposure. Such techniques may provide enhanced flash color for such areas, regions, objects, subjects, or the like of the scene or color balance among such areas, regions, objects, subjects, or the like of the scene.

Figure 5:
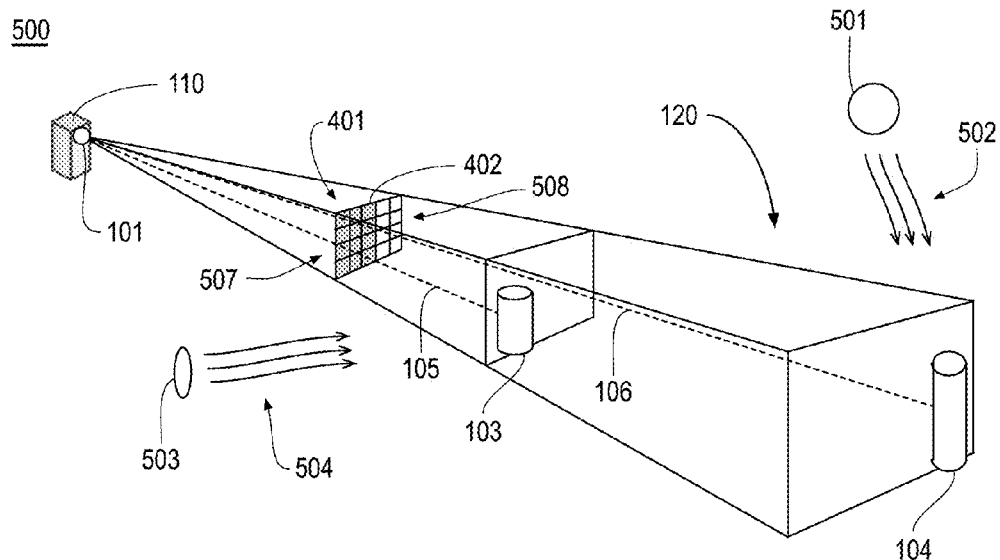
FIG. 5 is an illustrative diagram of an example exposure setting for providing spatially adjusted flash exposures with color control.

FIG. 5 is an illustrative diagram of an example exposure setting 500 for providing spatially adjusted flash exposures with color control, arranged in accordance with at least some implementations of the present disclosure. As shown in FIG. 5, exposure setting 500 is similar to exposure setting 100 as discussed with respect to FIG. 1. For example, exposure setting 500 may include imaging device 110 using flash 101 to attain an image of scene 120 including subject 103 and subject 104. Furthermore, color flash filter panel 402 may be provided to spatially adjust the intensity and/or color of light provided to scene 120 via flash 101. In some examples, as shown, scene 120 may be illuminated by ambient illumination source 501 and ambient illumination source 503. For example, ambient illumination source 501 may provide light 502 that substantially impacts illumination of subject 103 but does not substantially impact illumination of subject 104. Similarly, ambient illumination source 503 may provide light 504 that substantially impacts illumination of subject 104 but does not substantially impact illumination of subject 103. In the illustrated examples, two illumination sources are provided. However, exposure setting 500 may include any number of illumination sources. Furthermore, such illumination sources may each substantially impact the illumination of a single subject or two or more illumination sources may impact the illumination of a single or multiple subjects. For example, a wide array of subjects, subject positions, and illumination sources may be provided in exposure setting 500.

Furthermore, ambient illumination sources 131, 133 may be any illumination sources such as light bulbs, sunlight, reflections off objects, or the like. In some examples, light 502 from illumination source 501 and light 504 from illumination source 503 may have different colors. For example, if ambient illumination source 501 is sunlight, light 502 may have a substantially neutral white color and if ambient illumination source 503 is a light bulb, light 504 may have a non-neutral color such as a substantially white light source with blue tint, a green tint, or the like. In some examples, flash filter panel 102 may provide color balance for exposure of scene 120 such that subject 104 and subject 103 are exposed with substantially neural white light during image capture.

For example, if an exposure of exposure setting 500 were taken without use of color flash filter panel 402, illumination source 501 and illumination source 503 casting different colors on subject 104 and subject 103, respectively, may cause difficulties in image capture via imaging device 110. For example, imaging device 110 may attempt to color balance or white balance or the like based on one of subject 103 or subject 104 or both subjects and the resultant image may cause color error on the other or both of subject 103 and subject 104 and undesirable resultant images.

In some examples, a flash light provided via flash 101 may be spatially adapted via color flash filter panel 402 to cast the same color light on subject 103 and subject 104 during exposure. For example, if light 502 provides a substantially neutral white light and light 504 provides a color tinted light, color flash filter panel 402 may spatially adapt the light provided via flash 101 to subject 103 such that subject 103 will have substantially neutral white light during exposure via imaging device 110. For example, fully transparent region 508 may allow flash light from flash 101 to traverse fully transparent region 508 without color adjustment such that such light is substantially neutral white light and such that the overall exposure light on subject 104 is substantially neutral white light (e.g., both illumination source 501 and flash 101 may provide substantially neutral white light).

Furthermore, color adjusted region 507 of color flash filter panel 402 may alter or adjust the color of flash light from flash 101 to provide color adjustment to subject 103. Any color adjustment may be provided for any suitable purpose. For example, the adjusted color of flash light may compensate for the tint of light 504 from illumination source 503 such that subject 103 is illuminated with the same color of light as subject 104. Continuing the example of subject 104 being illuminated with substantially neutral white light, color adjusted region 507 may provide altered color flash light such that the combination of light 504 from illumination source 503 and the light from flash 101 after passing through color adjusted region 507 of color flash filter panel 402 provides substantially neutral white light to illuminate subject 103 during exposure. For example, the color of the sum of light 504 from illumination source 503 and the light from flash 101 after passing through color adjusted region 507 may equal the color of light 502 provided by illumination source 501 or the color of light 502 provided by illumination source 501 and the light from flash 101 after passing through fully transparent region 508. Furthermore, as discussed elsewhere herein, the intensity of light provided to subject 103 and subject 104 may also be adjusted via color flash filter panel 402.

FIG. 6 illustrates example device 400 for providing spatially adjusted flash exposures having color control, arranged in accordance with at least some implementations of the present disclosure. As shown and as discussed with respect to FIG. 4, device 400 may include color flash filter panel 402 having color pixels 401 including red sub-pixels 403, green sub-pixels 404, and blue sub-pixels 405, and a controller 413. As shown with respect to fully transparent region 508 and color adjusted region 507, color flash filter panel 402 may provide substantially neutral white light by providing fully transparent color pixels 401 in fully transparent region 508 and color adjusted color pixels 401 in color adjusted region 507. In some examples, such neutral white light may be provided by fully transparent color pixels 401 in fully transparent region 508 as shown in FIG. 6. In other examples, such neutral white light may be provided by providing transparency reduction in some color channels (e.g., via sub-pixels 403-405 of pixels) in fully transparent region 508 to compensate for the color of light provided by the flash. For example, LED flashes may be blue or green tinted and, in such examples, the transparency of red sub-pixels 403 in fully transparent region 508 may have an increased transparency with respect to green and blue sub-pixels 404, 405 in fully transparent region 508 to compensate for the flash light.

Furthermore, in color adjusted region 507, color adjustment may be provided as shown by adjusting the transparencies of red, green, and blue color channels such as red sub-pixels 603 in color adjusted region 507 being fully transparent, green sub-pixels 604 being less transparent, and blue sub-pixels 605 being even less transparent. For example, such a configuration may provide more red, and reduced greens and blues in the light provided through color flash filter panel 402 in color adjusted region 507. As discussed herein, color adjusted region 507 may be controlled to any number of color transparency states for the color channels. Such states may provide a gamut of color control available via color flash filter panel 402 for example. Furthermore, in the example of FIG. 6, each pixel 401 in color adjusted region 507 is adjusted to the same color transparency (e.g., sub-pixels 603-605 are adjusted by the same amount). In other examples, color pixels 401 of color adjusted region may have different sub-pixel transparency. Such operation may provide greater granularity in spatial color control for scene.

As discussed, such spatial flash color control may provide for white balance (e.g., matching the color of light provided to subjects such as subject 103 and 104), color balance, providing tint to particular objects subjects (e.g., increased reds, yellows, or oranges to human subjects), or the like. Such spatial flash color control may be provided via control signal 411 asserted via controller 413. For example, controller 413 may translate flash filter panel control parameters 410 to control signal 411. As discussed, in some examples, flash filter panel control parameters 410 may include region, sub-region, or pixel based data indicating transparencies, desired colors, or the like. In some examples, flash filter panel control parameters 410 may include a desired color output pattern in either the coordinates of color flash filter panel 402 or an image plane or the like such that controller 413 may translate such a desired color output pattern may be translated to control signal 411 via controller 413.

As discussed with respect to FIG. 1, flash filter panel 102, grayscale flash filter panel 302, or color flash filter panel 402 may be provided adjacent to a flash source such as a flash (e.g., flash 101), a flash module, or the like to provide illumination control (e.g., via grayscale flash filter panel 302 or color flash filter panel 402) and/or color control (e.g., via color flash filter panel 402). For example, the flash filter panel may be provided immediately adjacent to the flash source or with one or more components between the flash source and the flash filter panel.

Figure 7A:
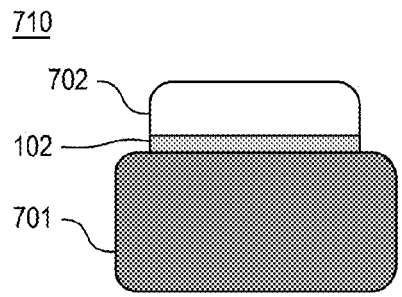
FIGS. 7A and 7B illustrate example flash filter panel and flash module configuration.
Figure 7B:
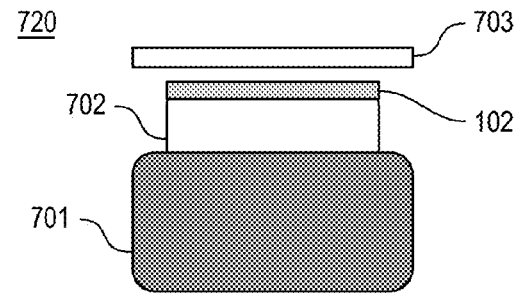

FIGS. 7A and 7B illustrate example flash filter panel and flash module configurations 710 and 720, arranged in accordance with at least some implementations of the present disclosure. In the illustrated examples of FIGS. 7A and 7B, flash filter panel 102 is illustrated. In other examples, grayscale flash filter panel 302 or color flash filter panel 402 may be implemented as shown in FIGS. 7A and 7B. As shown via configuration 710, in some examples, flash filter panel 102 may be provided immediately adjacent to a flash module 701. Flash module 701 may include any suitable flash module, flash, flash light, or the like. For example, flash module 701 may include an LED flash, a flash tube, or the like. For example, flash module 701 may include a flash or flash light source mounted in a housing or the like.

As also shown via configuration 710, a flash lens 702 may be provided immediately adjacent to flash filter panel 102. For example, configuration 710 may include flash filter panel 102 disposed immediately adjacent to flash module 701 and flash lens 702 disposed immediately adjacent to flash filter panel 102. As used herein, the term adjacent to is meant to indicate a relatively close vicinity of items and not that the items are necessarily touching or adjoined or the like. Furthermore as used herein, the term immediately adjacent is meant to indicate a relatively close vicinity of items, that the items have no other functional units therebetween, but not that the items are necessarily touching or adjoined or the like. For example, in configuration 710, flash module 701, flash filter panel 102, and flash lens 702 may or may not be adjoined or touching.

As shown via FIG. 7B, in configuration 720, flash module 701 and flash filter panel 102 may be adjacent and flash lens 702 may be provided therebetween. For example, in configuration 720, flash module 701 may be disposed immediately adjacent to flash lens 702 and flash filter panel 102 may be disposed immediately adjacent to flash lens 702. Furthermore, as shown, configuration 720 illustrates an optional cover lens 703 may be provided. For example, cover lens 703 may be provided immediately adjacent to flash filter panel 102 to protect flash filter panel 102.

In configurations 710 and 720, the illustrated components may be mounted or attached using any suitable technique or techniques such as gluing, mechanical connection (e.g., latches, clips, screw mounting), or the like. For example, configuration 710 may provide an integrated package suitable for integration into an imaging device or a flash device. In some examples, configuration 720 may provide an integrated package suitable for integration into an imaging device or flash device. In other examples, configuration 720 may provide flash filter panel 102 and optional cover lens 703 as a separate and/or removable unit that may be provided for an imaging device or flash device. For example, flash filter panel 102 and optional cover lens 703 may mount to flash module 701 and/or flash lens 702 in a removable fashion. In some examples, wiring or another power and communicative coupling may be provided to flash filter panel 102 to provide power and a control signal (e.g., control signal 311, 411, or 611) for the control of flash filter panel 102.

As discussed, a control signal may be provided to control a flash filter panel. Also as discussed, the control signal may be based on flash filter panel control parameters, which may be generated based on image data analysis or the like. Such techniques are discussed with respect to FIGS. 8-10 and elsewhere herein.

Figure 8:
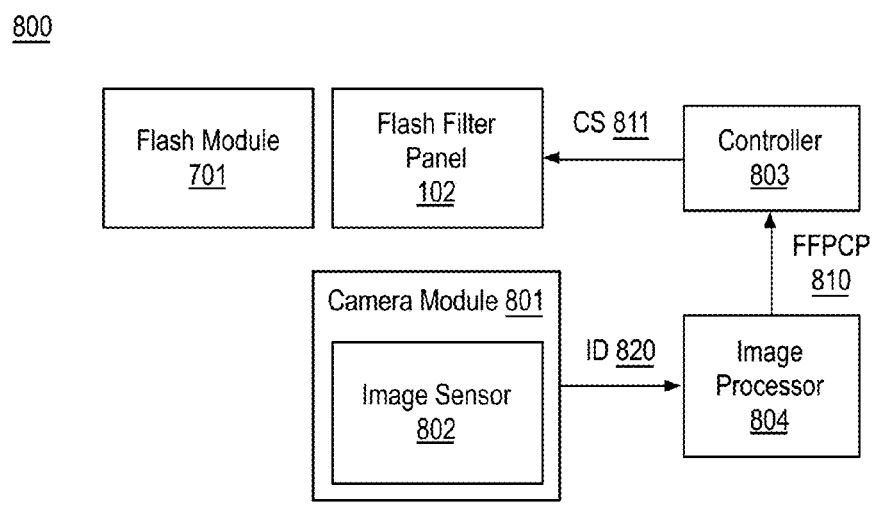
FIG. 8 illustrates an example device for providing spatially adjusted flash exposures.

FIG. 8 illustrates an example device 800 for providing spatially adjusted flash exposures, arranged in accordance with at least some implementations of the present disclosure. As shown, device 800 may include flash filter panel 102, flash module 701, a camera module 801 having an image sensor 802, a controller 803, and an image processor 804. For example, flash filter panel 102 may include any flash filter panel discussed herein such as grayscale flash filter panel 302 or color flash filter panel 402. Furthermore, flash module 701 may include any flash, flash light, or flash module discussed herein such as an LED flash, a flash tube, or the like. Also, as shown, camera module 801 of device 800 may include an image sensor 802. Image sensor 802 may include any suitable image sensor and image sensor 802 may detect light from a scene and translate the detected light to an electrical signal or data structure or the like representative of a captured image representative of the scene. Camera module 801 may include any suitable camera module including image sensor 802 and any other mechanisms (e.g. a shutter or the like) and any other circuitry (e.g., image preprocessors or the like) and camera module 801 may generate image data 820.

As shown, image data 820 may be provided to image processor 804. Image processor 804 may include any suitable image processor, image processing circuitry, and/or related circuitry. As shown, in some examples, image processor 804 may receive image data 820 and image processor 804 may generate flash filter panel control parameters 810. For example, image processor 804 may generate flash filter panel control parameters 810 based on image data 820 and/or image data generated by image processor 804. Flash filter panel control parameters 810 may include any suitable data, data structure, signaling, or the like representative of a desired brightness pattern, dimming pattern, flash filter region transparency adjustment pattern, color pattern, or the like. For example, flash filter panel control parameters 810 may include data representing desired brightness adjustments for a scene (e.g., brightness ratios associated with locations within an image plane for a scene), data representing transparency adjustment parameters, color adjustments for a scene, data representing color transparency adjustment parameters, or the like.

In some examples, image data 820 may include image data attained during a pre-flash sequence. For example, the pre-flash sequence may execute a flash light via flash module 701 with flash filter panel 102 having all regions at full transparency to attain, via image sensor 802, image data 820. Such image data 820 may be evaluated via image processor 804 to determine brightness values and/or color values associated with regions or subjects of image data 820 and to generate flash filter panel control parameters 810 based on such brightness and/or color values. For example, a dimmest region or subject or another portion represented by image data 820 may be analyzed to determine if a proper exposure may be attained. If so, brighter regions represented by image data 820 may be evaluated to determine if such regions should be dimmed via flash filter panel 102. If so, flash filter panel control parameters 810 may indicate transparency reduction parameters or ratios or the like to reduce the transparency of such regions. In other examples, color values may be evaluated to determine whether white or color balancing among subjects in the scene may be advantageously applied via flash color adjustments as discussed herein.

In addition or in alternative, image data 820 may include image data attained during a pre-exposure sequence that does not implement a flash. In such examples, image data 820 attained with our without a flash may be used to generate a depth map associated with a scene. For example, image processor 804 may generate such a depth map or the like, which may be us used to determine flash filter panel control parameters 810. For example, a flash intensity may be determined based on a proper exposure of a region or subject represented by image data 820 such that the region or subject is at a greatest subject distance (e.g., at a non-infinite or presumed background distance or the like) from flash module 701 or camera module 801 or the like. Based on the relative distance from other regions or subjects to the region or subject at the greatest distance, flash filter panel control parameters 810 may include transparency adjustment or reduction parameters for the final exposure. For example, such transparencies may be provided as a ratio of the distance to the subject or region to the distance to the subject or region at the greatest subject distance. For example, the closer the subject is to the subject at the greatest subject in the image plane, the smaller the transparency reduction and, the farther forward the subject is to the subject at the greatest subject in the image plane, the greater the transparency reduction.

In yet other examples, image data 820 may be evaluated for object detection or the like. For example, facial detection may be performed to detect subjects for brightness and/or depth data evaluation as discussed. For example, the discussed techniques may be particularly advantageous when attempting to attain proper images of people at different distances from flash module 701. In other examples, flash filter panel control parameters 810 may be varied based on other detected objects. For example, flash filter panel control parameters 810 that reduce transparency may be provided in regions associated with a detected vehicle, shiny object, pane of glass or the like such that little or no glare is provided by such objects.

Furthermore, such object detection may be particularly advantageous when implementing color flash filter panel 402. For example, as discussed, detected face regions and/or other skin regions may be provided with red, yellow, or orange tinted flash light via flash filter panel control parameters 810. For example, image processor 804 may generate bounding boxes or coordinates or the like associated with detected objects and such locations within the image plane may be translated to regions of flash filter panel control parameters 810. Such translation may be performed by image processor 804 or controller 803. For example, flash filter panel control parameters 810 may be represented either in coordinates associated with the image plane or coordinates associated with flash filter panel 102.

As shown, flash filter panel control parameters 810 may be transferred to controller 803, which may, as discussed herein with respect to controllers 303 and 413, translate flash filter panel control parameters 810 into control signal 811. Control signal 811 may be provided to flash filter panel 102, which may adjust the transparencies of regions 102 as discussed herein based on control signal 811.

Figure 9:
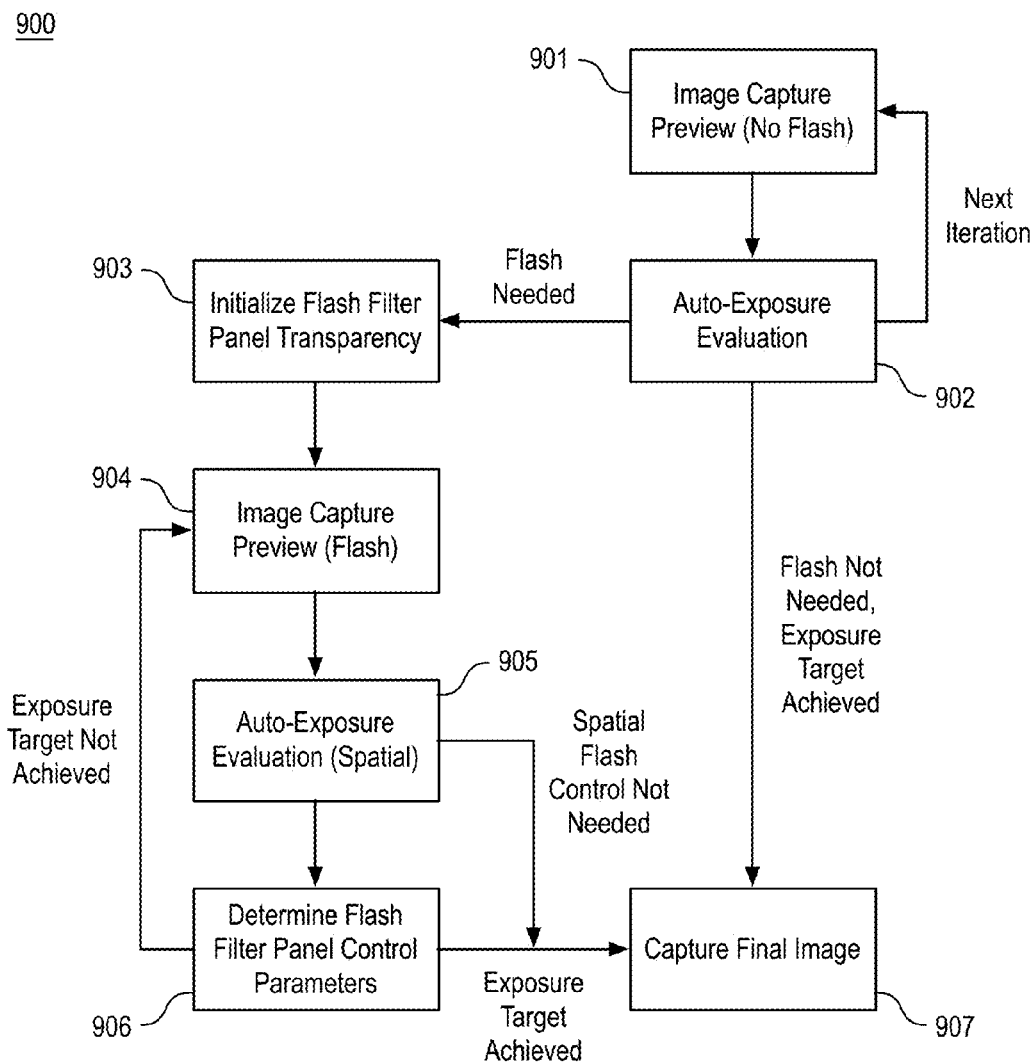
FIG. 9 illustrates an example process for providing spatially adjusted flash exposures.

FIG. 9 illustrates an example process 900 for providing spatially adjusted flash exposures, arranged in accordance with at least some implementations of the present disclosure. Process 900 may include one or more operations 901-907 as illustrated in FIG. 9. Process 900 may form at least part of a spatially adjusted flash process. By way of non-limiting example, process 900 may form at least part of a spatially adjusted flash process for imaging device 800 as discussed herein. Furthermore, process 900 will be described herein with reference to device 800 of FIG. 8.

Process 900 may begin at operation 901, "Image Capture Preview (No Flash)", where an image capture preview may be performed with no flash implementation. For example, a user may initiate an image capture sequence by depressing a button or tapping a view screen to begin auto-focus operations, exposure operations, or the like. In other examples, an application may initiate the image capture sequence. In response to such a request, image sensor 802 may provide image capture to attain image data 820. Such image data 820 may include image data for a single image capture or for multiple image captures (e.g., a sequence of frames). In some examples, such image capture preview operation may be performed at a lower resolution that a final image capture.

As shown, process 900 may continue at operation 902, "Auto-Exposure Evaluation", where auto-exposure evaluation processing may occur. For example, image data attained associated with a scene may be evaluated to generate auto-exposure statistics or the like. For example, image processor 804 may evaluate image data 820 for one or more images to generate auto-exposure statistics or the like. As shown, if no exposure is performed (e.g., a user or application did not initiate a final exposure of the scene or the like), process 900 may continue at operation 901 at a next iteration. If an exposure is initiated or continued by a user or an application or the like, auto-exposure evaluation operation 902 may include a decision operation to determine whether a flash is needed to properly expose the scene. Such a decision may be based on the generated auto-exposure statistics representing the scene for example.

If a determination is made that no flash is needed, process 900 may continue at operation 907, "Capture Final Image", where a final image may be captured without need of a flash using any suitable technique or techniques. For example, a determination may be made that an exposure target is achieved (e.g., based on auto-exposure statistics and data determined at operation 902) and camera module 801 may attain final image data via image sensor 802 without operation of flash module 701.

If a determination is made that a flash is needed, process 900 may continue at operation 903, "Initialize Flash Filter Panel Transparency", where transparencies of regions of a flash filter panel may be initialized. For example, flash filter panel 102 (e.g., grayscale flash filter panel 302, color flash filter panel 402, or any other flash filter panel discussed herein) may be initialized. Such an initialization may be performed via control signal 811 provided via controller 803. The initialization may provide any known, default, or standard initialization pattern for pixels of the flash filter panel. For example, the initialization may provide full transparency for all pixels or regions of the flash filter panel.

Process 900 may continue at operation 904, "Image Capture Preview (Flash)", where an image capture preview may be performed with a flash implementation. For example, the preview with flash implementation may be characterized as a pre-flash sequence or the like. For example, image sensor 802 may provide image capture during implementation of a flash light provided by flash module 701 and through a fully transparent flash filter panel 102. In some examples, such image capture preview operation may be performed at a lower resolution that a final image capture. In some examples, brightness or luminance data, color data, and/or depth data as discussed herein may be generated via image processor 804 during such image capture preview operations. In some examples, both image data attained via operation 901 and image data attained via operation 903 may be used to perform operation 905 and/or operation 906.

Process 900 may continue at operation 905, "Auto-Exposure Evaluation (Spatial)", where spatial auto-exposure evaluation processing may occur. For example, image data attained associated with the scene using the flash may be evaluated to generate auto-exposure statistics or the like. For example, image processor 804 may evaluate image data 820 for an image attained using the flash as discussed at operation 904 to generate auto-exposure statistics or the like. As shown, if no spatial flash control is needed, process 900 may continue at operation 907, where, as discussed, where a final image may be captured using a flash with the flash filter panel adjusted to apply the initialization settings. For example, camera module 801 may attain final image data via image sensor 802 with flash module 701 providing a flash light based on auto-exposure statistics and data determined at operation 905 using the flash filter panel settings implemented at operation 903.

If spatial flash control is needed, process 900 may continue at operation 906, "Determine Flash Filter Panel Control Parameters", where flash filter panel control parameters may be determined as discussed herein. For example, flash filter panel control parameters may be determined via image processor 804 based on brightness image data by providing transparency adjustment parameters based on relative brightness within the brightness image data, based on depth data by providing transparency adjustment parameters based on the inverse square of a subject represented within the depth data from device 800, based on object detection performed on the attained image data, based on color image data to provide color balance, or the like.

As shown, if an exposure target is not achieved based on operations 905 and 906, process 900 may continue at operation 904 where an image capture preview with flash may be repeated. For example, if the prior image capture preview with flash included overexposed sections to the point of saturation, operations 905 and 906 may not attain valid auto-exposure statistics (e.g., for providing a valid flash intensity) and/or valid flash filter panel control parameters. In such instances, the image capture preview with flash may be repeated with a lower pre-flash intensity in an attempt to attain valid auto-exposure statistics and/or valid flash filter panel control parameters. Such processing may be repeated any number of times as needed.

If an exposure target is achieved, process 900 may continue at operation 907 as discussed where a final image may be captured using a flash with the flash filter panel adjusted to apply the settings attained at operation 906. For example, camera module 801 may attain final image data via image sensor 802 with flash module 701 providing a flash light based on auto-exposure statistics and data determined at operation 905 using the flash filter panel settings determined at operation 905. As discussed, such flash filter panel settings may provide spatially adjusted or control flash light intensity and/or flash light color.

Process 900 may be repeated any number of times for any number of exposures implemented via a user. Process 900 may provide an exposure control loop for attaining final image data using no flash, flash without spatial control, or flash with spatial control. Furthermore, such flash with spatial control may provide spatial control of flash intensity or spatial control of flash intensity and spatial control of flash color as discussed herein.

Figure 10:
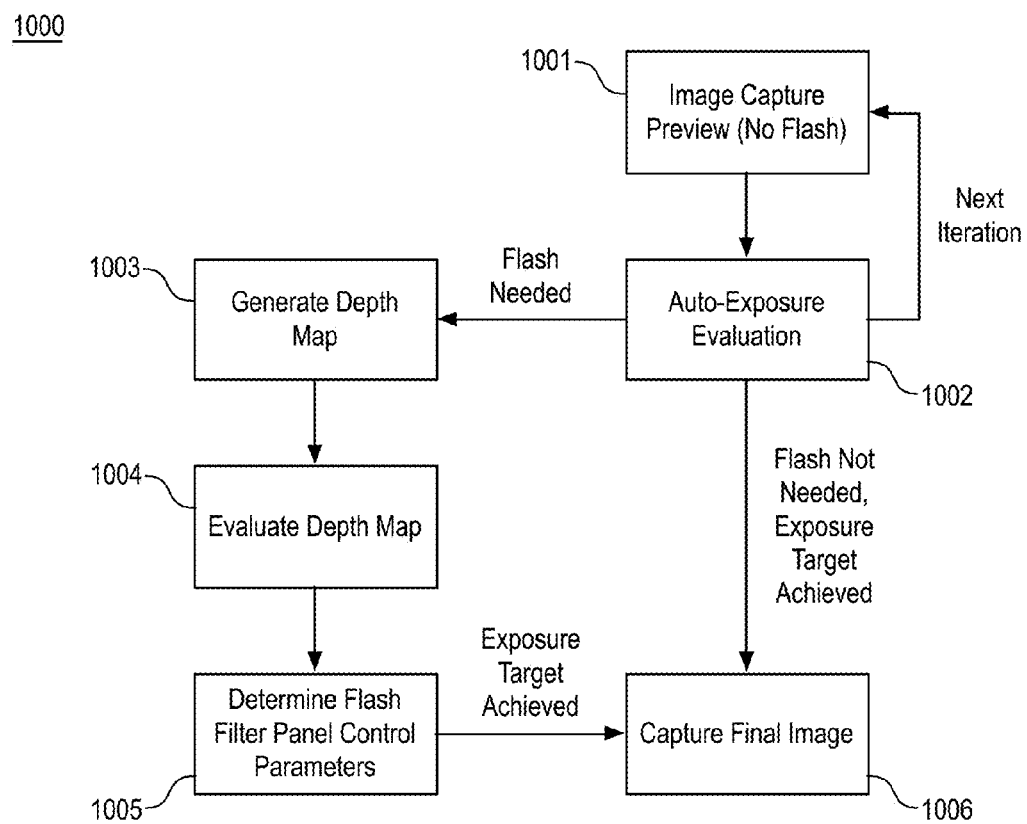
FIG. 10 illustrates an example process for providing spatially adjusted flash exposures.

FIG. 10 illustrates an example process 1000 for providing spatially adjusted flash exposures, arranged in accordance with at least some implementations of the present disclosure. Process 1000 may include one or more operations 1001-1006 as illustrated in FIG. 10. Process 1000 may form at least part of a spatially adjusted flash process. By way of non-limiting example, process 1000 may form at least part of a spatially adjusted flash process for imaging device 1000 as discussed herein. Furthermore, process 1000 will be described herein with reference to device 800 of FIG. 8.

Process 1000 may begin at operation 1001, "Image Capture Preview (No Flash)", where an image capture preview may be performed with no flash implementation. For example, a user may initiate an image capture sequence by depressing a button or tapping a view screen to begin auto-focus operations or an application may initiate an image capture sequence or the like. In response to such a request, image sensor 802 may provide image capture to attain image data 820. Such image data 820 may include image data for a single image capture or for multiple image captures at the resolution of the final image capture or a reduced resolution.

Process 1000 may continue at operation 1002, "Auto-Exposure Evaluation", where auto-exposure evaluation processing may occur. For example, image data attained associated with a scene may be evaluated to generate auto-exposure statistics or the like. For example, image processor 804 may evaluate image data 820 for one or more images to generate such auto-exposure statistics. As shown, if no exposure is performed, process 1000 may continue at operation 1001 at a next iteration. If an exposure is initiated or continued by a user or an application or the like, auto-exposure evaluation operation 1002 may include a decision operation to determine whether a flash is needed to properly expose the scene. Such a decision may be based on the generated auto-exposure statistics representing the scene for example.

If a determination is made that no flash is needed, process 1000 may continue at operation 1006, "Capture Final Image", where a final image may be captured without need of a flash using any suitable technique or techniques. For example, camera module 801 may attain final image data via image sensor 802 without operation of flash module 701 based on auto-exposure statistics and data determined at operation 1002.

If a determination is made that a flash is needed, process 1000 may continue at operation 1003, "Generate Depth Map", where a depth map or depth data or the like may be generated based on the image data attained at operation 1001. For example, the depth map may include data representing the distance of regions or subjects of the image data from a viewpoint (e.g., from device 800, from an approximated focal plane, or the like).

Process 1000 may continue at operation 1004, "Evaluate Depth Map", where the depth may be evaluated. The depth map may be evaluated using any suitable technique or techniques. For example, the depth map may be evaluated via image processor 804 to determine distances to subjects represented by image data 802, perform object detection, or the like.

Furthermore, process 1000 may continue at operation 1005, "Determine Flash Filter Panel Control Parameters", where flash filter panel control parameters may be determined as discussed herein. For example, flash filter panel control parameters may be determined via image processor 804 based on the depth map generated at operation 1003, the evaluation of the depth map performed at operation 1004, and/or image data attained at operation 1001. For example, flash filter panel control parameters may be determined by generating transparency adjustment parameters based on relative distances within a depth map and/or based on color data in image data attained at operation 1001. For example, the flash filter panel control parameters may include full transparency for regions of the flash filter panel or regions of the image plane associated with subjects or regions that are at or farther than a greatest subject distance. Furthermore, the flash filter panel control parameters may include a transparency adjustment to reduce the transparency of other regions or subjects (e.g., for those regions or subjects closer to flash module 701) by multiplying the full transparency by a square of the ratio of the distance to the other region over the greatest subject distance. For example, if the greatest subject distance is $d_1$ and the other region or subject is at a distance of $d_2$ (e.g., such that $d_2 < d_1$ the transparency of the region may be determined as full transparency multiple by $(d_2/d_1)^2$. Furthermore, color adjustments may be made based on an evaluation of image data attained at operation 1001 to provide color balance or the like.

As shown, process 1000 may continue with the achieved exposure target at operation 1006 as discussed where a final image may be captured using a flash with the flash filter panel adjusted to apply the settings attained at operation 1005. For example, camera module 801 may attain final image data via image sensor 802 with flash module 701 providing a flash light based on auto-exposure statistics and data determined at operation 1002 using the flash filter panel settings determined at operation 1005. As discussed, such flash filter panel settings may provide spatially adjusted or control flash light intensity and/or flash light color.

Process 1000 may be repeated any number of times for any number of exposures implemented via a user. Process 1000 may provide an exposure control loop for attaining final image data using no flash or flash with spatial control. Furthermore, such flash with spatial control may provide spatial control of flash intensity or spatial control of flash intensity and spatial control of flash color as discussed herein.

Figure 11:
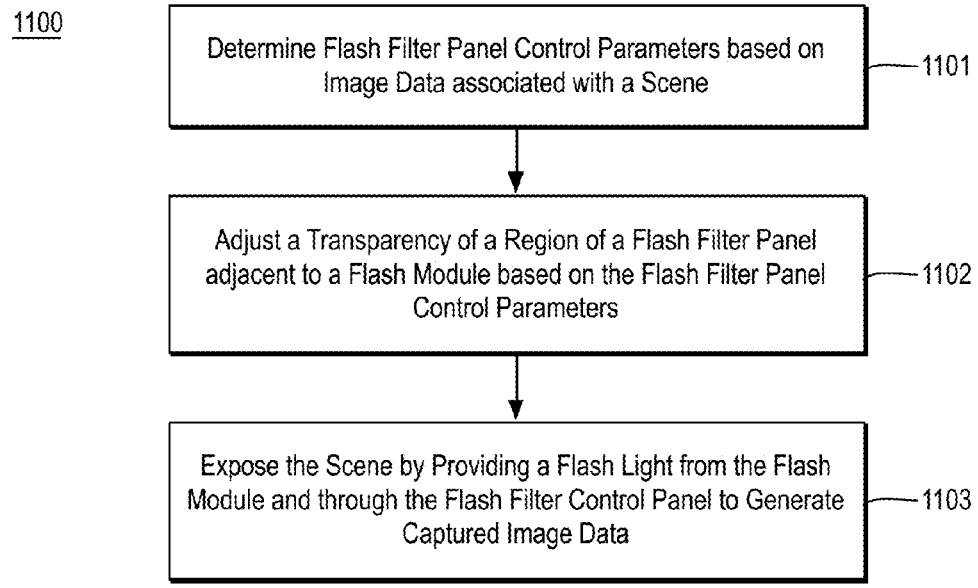
FIG. 11 is a flow diagram illustrating an example process for providing spatially adjusted flash exposures.

FIG. 11 is a flow diagram illustrating an example process 1100 for providing spatially adjusted flash exposures, arranged in accordance with at least some implementations of the present disclosure. Process 1100 may include one or more operations 1101-1103 as illustrated in FIG. 11. Process 1100 may form at least part of a spatially adjusted flash exposure technique. By way of non-limiting example, process 1100 may form at least part of a spatially adjusted flash exposure technique performed by device 300, 400, 800 or any other device discussed herein. Furthermore, process 1100 will be described herein with reference to system 1200 of FIG. 12.

Figure 12:
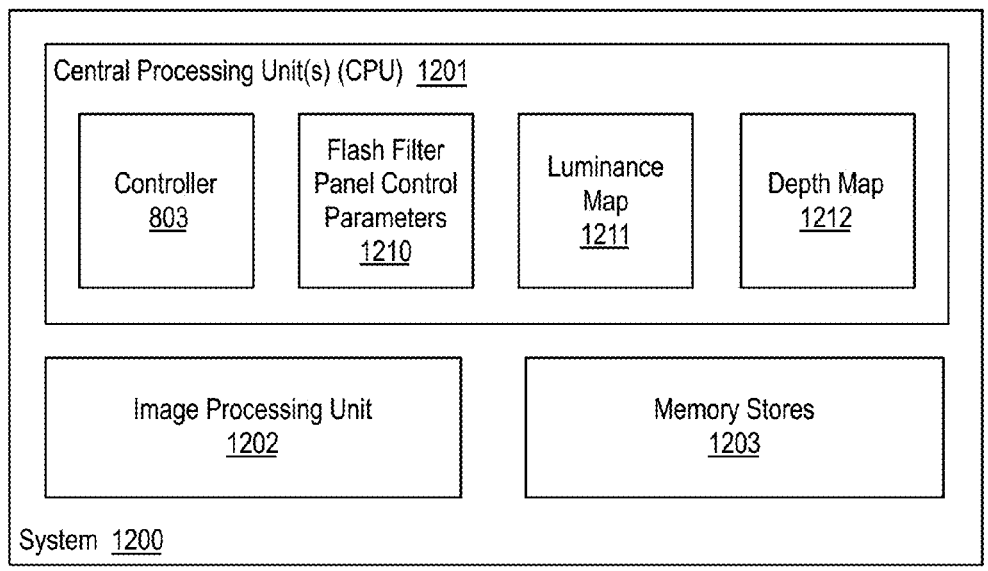
FIG. 12 is an illustrative diagram of an example system for providing spatially adjusted flash exposures.

FIG. 12 is an illustrative diagram of an example system 1200 for providing spatially adjusted flash exposures, arranged in accordance with at least some implementations of the present disclosure. As shown in FIG. 12, system 1200 may include one or more central processing units (CPU) 1201, an image processing unit 1202, and memory stores 1203. Also as shown, central processing units 1201 may include controller 803, flash filter panel control parameters module 1210, luminance map module 1211, and depth map module 1212. Such modules may be implemented to perform operations as discussed herein. In the example of system 1200, memory stores 1203 may store image data, flash filter panel control parameters, control signal data, depth map data, brightness or luminance map data, auto-exposure statistics, raw image data, or the like.

As shown, in some examples, controller 803, flash filter panel control parameters module 1210, luminance map module 1211, and depth map module 1212 may be implemented via central processing units 1201. In other examples, one or more or portions of controller 803, flash filter panel control parameters module 1210, luminance map module 1211, and depth map module 1212 may be implemented via image processing unit 1202 or a graphics processing unit. In yet other examples, one or more or portions of controller 803, flash filter panel control parameters module 1210, luminance map module 1211, and depth map module 1212 may be implemented via an imaging processing pipeline or unit.

Image processing unit 1202 may include any number and type of graphics or image processing units that may provide the operations as discussed herein. In some examples, image processing unit may be an image signal processor. Such operations may be implemented via software or hardware or a combination thereof. For example, image processing unit 1202 may include circuitry dedicated to manipulate image data obtained from memory stores 1203. Central processing units 1201 may include any number and type of processing units or modules that may provide control and other high level functions for system 1200 and/or provide any operations as discussed herein. Memory stores 1203 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1203 may be implemented by cache memory.

In an embodiment, one or more or portions of controller 803, flash filter panel control parameters module 1210, luminance map module 1211, and depth map module 1212 may be implemented via an execution unit (EU) of image processing unit 1202. The EU may include, for example, programmable logic or circuitry such as a logic core or cores that may provide a wide array of programmable logic functions. In an embodiment, one or more or portions of controller 803, flash filter panel control parameters module 1210, luminance map module 1211, and depth map module 1212 may be implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or more or portions of controller 803, flash filter panel control parameters module 1210, luminance map module 1211, and depth map module 1212 may be implemented via an application specific integrated circuit (ASIC). The ASIC may include an integrated circuitry customized to perform the operations discussed herein.

For example, controller 803 may perform any operations as discussed herein with respect to controllers 303, 413, or 803, flash filter panel control parameters module 1210 may perform any operations as discussed herein with respect to generating flash filter panel control parameters, luminance map module 1211 may perform any operations as discussed herein with respect to generating a brightness or luminance map or any other associated data, and depth map module 1212 may perform any operations as discussed herein with respect to generating a depth map or depth data or any other associated data.

Returning to discussion of FIG. 11, process 1100 may begin at operation 1101, "Determine Flash Filter Panel Control Parameters based on Image Data associated with a Scene", where flash filter panel control parameters may be determined based on image data associated with a scene. For example, flash filter panel control parameters module 1210 as implemented via central processing units 1201 may generate the flash filter panel control parameters. The flash filter panel control parameters may be generated using any suitable technique or techniques.

In some examples, determining the flash filter panel control parameters may include obtaining the image data during a pre-flash exposure of the scene, determining a first brightness of a first subject of the scene and a second brightness of a second subject of the scene based on the image data such that the first subject of the scene is associated with the region of the flash filter panel and the second subject of the scene is associated with a second region of the flash filter panel, and generating a transparency parameter for the region of the flash filter panel based on the first brightness and the second brightness. In such examples, the image data may include brightness data, illumination data, a luminance map, or the like. For example, luminance map module 1211 as implemented via central processing units 1201 may generate the brightness data, illumination data, luminance map, or the like. For example, the transparency parameter may be a ratio of the second brightness to the first brightness. Furthermore, during the pre-flash exposure of the scene, every region of the flash filter panel may be set to full transparency.

In some examples, determining the flash filter panel control parameters may include determining a first subject distance associated with the region of the flash filter panel and a second subject distance associated with a second region of the flash filter panel. Such subject distances may be determined using any suitable technique or techniques. For example, the image data may include a depth map associated with the scene and the subject distances may be determined based on the depth map. For example, depth map module 1211 as implemented via central processing units 1201 may generate a depth map, depth data, or the like. Furthermore, in some examples, the second subject distance may be greater than the first subject distance and the flash filter panel control parameters may indicate full transparency for the second region of the flash filter panel and a reduced transparency for the region of the flash filter panel. For example, the reduced transparency may be the full transparency multiplied by a square of a ratio of the first distance to the second distance.

Processing may continue at operation 1102, "Adjust a Transparency of a Region of a Flash Filter Panel adjacent to a Flash Module based on the Flash Filter Panel Control Parameters", where a transparency of a region of a flash filter panel adjacent to a flash module of the imaging device may be adjusted based on the flash filter panel control parameters. For example, controller 803 as implemented via central processing units 1201 may generate a control signal based on the flash filter panel control parameters to control the flash filter panel to adjust transparencies of regions or pixels or the like of the flash filter panel. As discussed, the flash filter panel may be any suitable flash filter panel with any number of transparency adjustable regions or pixels. For example, the flash filter panel may be configured to be mounted adjacent to a flash module as discussed herein. For example, the flash filter panel may be disposed between the flash module and a flash module lens or the flash filter panel and a cover lens may be configured to be mounted immediately adjacent to a flash module lens that is immediately adjacent to the flash module.

In some examples, the flash filter panel may be a grayscale liquid-crystal display panel having not less than 20 transparency adjustable regions. In other examples, the flash filter panel may be a color liquid-crystal display panel and the regions may be or include pixels having red sub-pixels, green sub-pixels, and blue sub-pixels, or the like. For example, the flash filter panel may be a color flash filter panel and adjusting the transparency of the region may include adjusting a color transparency of the region. In some examples, the region may be associated with a skin region of the scene and adjusting the color transparency of the region may include providing a red color tint for the first region. In other examples, adjusting the color transparency of the region may include adjusting the color transparency to compensate for an ambient light source color difference between a first ambient illumination source provided to a first subject associated with the region of the flash filter panel and a second ambient illumination source provided to a second subject associated with a second region of the flash filter panel. In yet other examples, the flash module may include a light-emitting diode flash and adjusting the color transparency of the region may include providing a red color tint for the region.

Processing may continue at operation 1103, "Expose the Scene by Providing a Flash Light from the Flash Module and through the Flash Filter Panel to Generate Captured Image Data", where the scene may be exposed by providing a flash light from the flash module and through the flash filter panel to generate captured image data. For example, system 1200 may further include a flash module to provide the flash light and a camera module having an image sensor to capture and/or generate captured image data (e.g., final captured image data). System 1200 may be provided in any form factor device as discussed herein such as a camera, a smartphone, an ultrabook, a laptop, or a tablet.

Process 1100 may be repeated any number of times for any number of image capture operations for still images or for capture frames of a video sequence. For example, the flash module as discussed herein may provide a continuous light source during capture of such frames of a video sequence. Process 1100 may provide for high quality captured image data. Such captured image data may be processed using any suitable image processing techniques.

Various components of the systems described herein may be implemented in software, firmware, and/or hardware and/or any combination thereof. For example, various components of device 300, device 400, device 800, system 1200, or device 1400 may be provided, at least in part, by hardware of a computing System-on-a-Chip (SoC) such as may be found in a multi-function device or a computing system such as, for example, a laptop computer, a tablet, or a smart phone. Those skilled in the art may recognize that systems described herein may include additional components that have not been depicted in the corresponding figures. For example, the systems discussed herein may include additional components such as scanners (e.g., to perform optical scanning to generate scanned input images), printers (e.g., to translate an output image to paper or similar physical media), image pre-processing circuitry, or the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of device 300, device 400, device 800, system 1200, or device 1400, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 13:
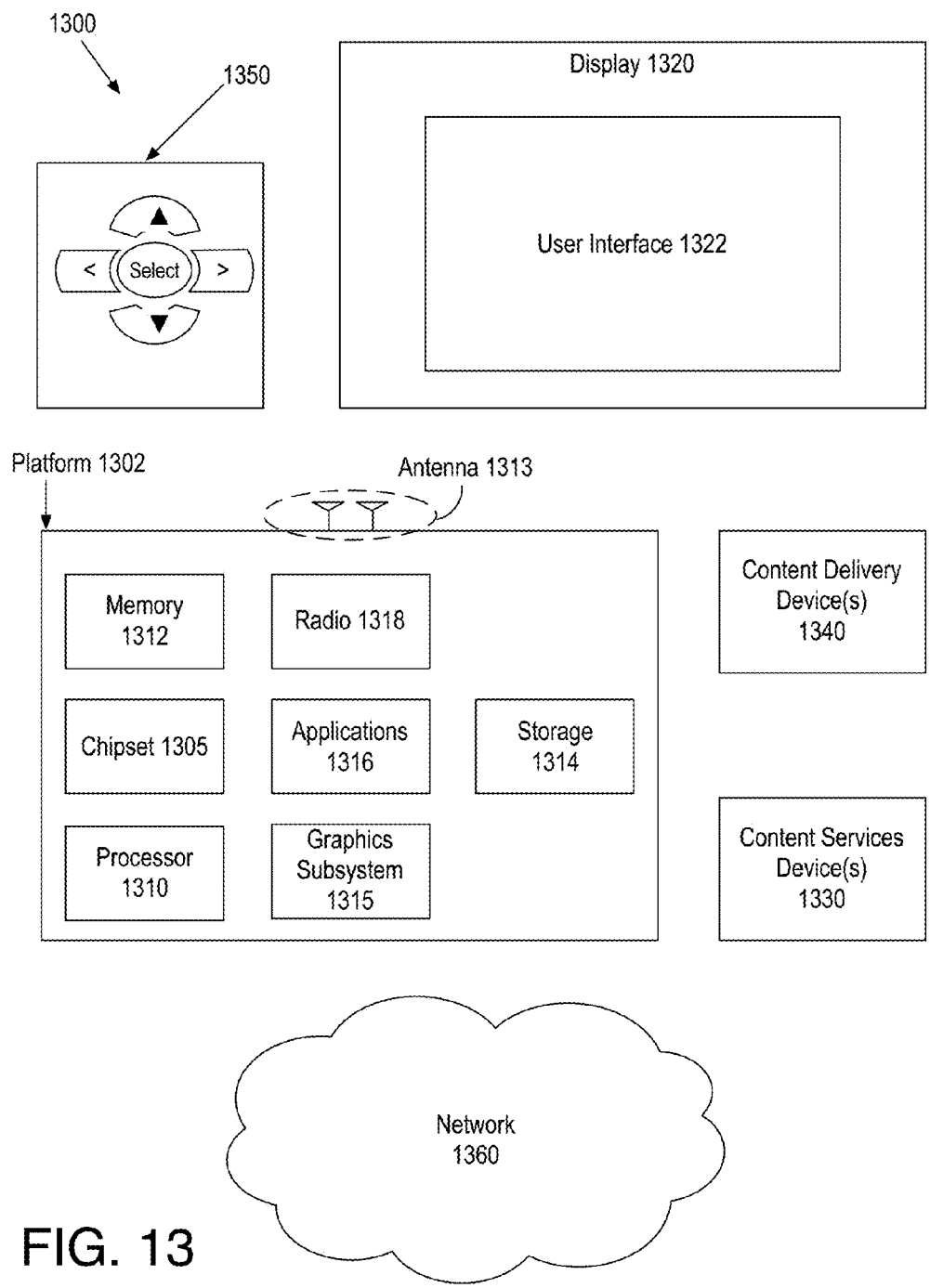
FIG. 13 is an illustrative diagram of an example system.

FIG. 13 is an illustrative diagram of an example system 1300, arranged in accordance with at least some implementations of the present disclosure. In various implementations, system 1300 may be a media system although system 1300 is not limited to this context. For example, system 1300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1300 includes a platform 1302 coupled to a display 1320. Platform 1302 may receive content from a content device such as content services device(s) 1330 or content delivery device(s) 1340 or other similar content sources. A navigation controller 1350 including one or more navigation features may be used to interact with, for example, platform 1302 and/or display 1320. Each of these components is described in greater detail below.

In various implementations, platform 1302 may include any combination of a chipset 1305, processor 1310, memory 1312, antenna 1313, storage 1314, graphics subsystem 1315, applications 1316 and/or radio 1318. Chipset 1305 may provide intercommunication among processor 1310, memory 1312, storage 1314, graphics subsystem 1315, applications 1316 and/or radio 1318. For example, chipset 1305 may include a storage adapter (not depicted) capable of providing intercommunication with storage 1314.

Processor 1310 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1310 may be dual-core processor(s), dual-core mobile processor(s), and so forth.

Memory 1312 may be implemented as a volatile memory device such as, but not limited to, a Random Access Memory (RAM), Dynamic Random Access Memory (DRAM), or Static RAM (SRAM).

Storage 1314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1314 may include technology to increase the storage performance enhanced protection for valuable digital media when multiple hard drives are included, for example.

Graphics subsystem 1315 may perform processing of images such as still or video for display. Graphics subsystem 1315 may be a graphics processing unit (GPU) or a visual processing unit (VPU), for example. An analog or digital interface may be used to communicatively couple graphics subsystem 1315 and display 1320. For example, the interface may be any of a High-Definition Multimedia Interface, DisplayPort, wireless HDMI, and/or wireless HD compliant techniques. Graphics subsystem 1315 may be integrated into processor 1310 or chipset 1305. In some implementations, graphics subsystem 1315 may be a stand-alone device communicatively coupled to chipset 1305.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1318 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1318 may operate in accordance with one or more applicable standards in any version.

In various implementations, display 1320 may include any television type monitor or display. Display 1320 may include, for example, a computer display screen, touch screen display, video monitor, television-like device, and/or a television. Display 1320 may be digital and/or analog. In various implementations, display 1320 may be a holographic display. Also, display 1320 may be a transparent surface that may receive a visual projection. Such projections may convey various forms of information, images, and/or objects. For example, such projections may be a visual overlay for a mobile augmented reality (MAR) application. Under the control of one or more software applications 1316, platform 1302 may display user interface 1322 on display 1320.

In various implementations, content services device(s) 1330 may be hosted by any national, international and/or independent service and thus accessible to platform 1302 via the Internet, for example. Content services device(s) 1330 may be coupled to platform 1302 and/or to display 1320. Platform 1302 and/or content services device(s) 1330 may be coupled to a network 1360 to communicate (e.g., send and/or receive) media information to and from network 1360. Content delivery device(s) 1340 also may be coupled to platform 1302 and/or to display 1320.

In various implementations, content services device(s) 1330 may include a cable television box, personal computer, network, telephone, Internet enabled devices or appliance capable of delivering digital information and/or content, and any other similar device capable of uni-directionally or bi-directionally communicating content between content providers and platform 1302 and/display 1320, via network 1360 or directly. It will be appreciated that the content may be communicated uni-directionally and/or bi-directionally to and from any one of the components in system 1300 and a content provider via network 1360. Examples of content may include any media information including, for example, video, music, medical and gaming information, and so forth.

Content services device(s) 1330 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1302 may receive control signals from navigation controller 1350 having one or more navigation features. The navigation features of controller 1350 may be used to interact with user interface 1322, for example. In various embodiments, navigation controller 1350 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1350 may be replicated on a display (e.g., display 1320) by movements of a pointer, cursor, focus ring, or other visual indicators displayed on the display. For example, under the control of software applications 1316, the navigation features located on navigation controller 1350 may be mapped to virtual navigation features displayed on user interface 1322, for example. In various embodiments, controller 1350 may not be a separate component but may be integrated into platform 1302 and/or display 1320. The present disclosure, however, is not limited to the elements or in the context shown or described herein.

In various implementations, drivers (not shown) may include technology to enable users to instantly turn on and off platform 1302 like a television with the touch of a button after initial boot-up, when enabled, for example. Program logic may allow platform 1302 to stream content to media adaptors or other content services device(s) 1330 or content delivery device(s) 1340 even when the platform is turned "off." In addition, chipset 1305 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1300 may be integrated. For example, platform 1302 and content services device(s) 1330 may be integrated, or platform 1302 and content delivery device(s) 1340 may be integrated, or platform 1302, content services device(s) 1330, and content delivery device(s) 1340 may be integrated, for example. In various embodiments, platform 1302 and display 1320 may be an integrated unit. Display 1320 and content service device(s) 1330 may be integrated, or display 1320 and content delivery device(s) 1340 may be integrated, for example. These examples are not meant to limit the present disclosure.

In various embodiments, system 1300 may be implemented as a wireless system, a wired system, or a combination of both. When implemented as a wireless system, system 1300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 13.

Figure 14:
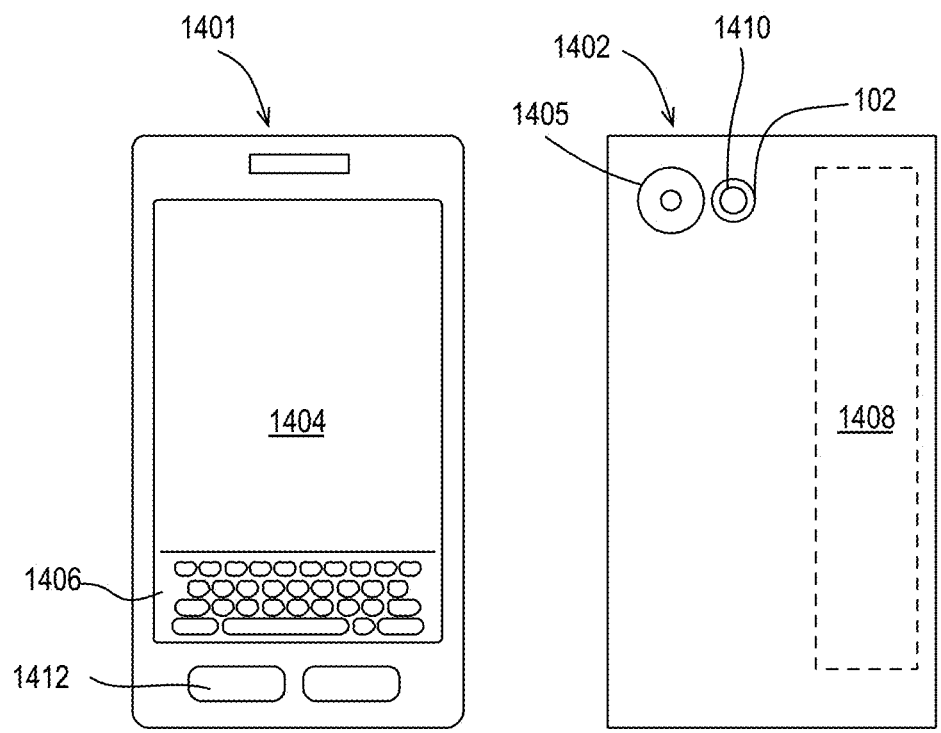
FIG. 14 illustrates an example small form factor device, all arranged in accordance with at least some implementations of the present disclosure.

As described above, system 1300 may be embodied in varying physical styles or form factors. FIG. 14 illustrates an example small form factor device 1400, arranged in accordance with at least some implementations of the present disclosure. In some examples, system 1300 may be implemented via device 1400. In other examples, device 300, 400, or 800, system 1200, or portions thereof may be implemented via device 1400. In various embodiments, for example, device 1400 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 14, device 1400 may include a housing with a front 1401 and a back 1402. Device 1400 includes a display 1404, an input/output (I/O) device 1406, and an integrated antenna 1408. Device 1400 also may include navigation features 1412. I/O device 1406 may include any suitable I/O device for entering information into a mobile computing device. Examples for I/O device 1406 may include an alphanumeric keyboard, a numeric keypad, a touch pad, input keys, buttons, switches, microphones, speakers, voice recognition device and software, and so forth. Information also may be entered into device 1400 by way of microphone (not shown), or may be digitized by a voice recognition device. As shown, device 1400 may include a camera 1405 (e.g., including a lens, an aperture, and an imaging sensor), a flash 1410, and flash filter panel 102 integrated into back 1402 (or elsewhere) of device 1400. In other examples, camera 1405, flash 1410, and flash filter panel 102 may be integrated into front 1401 of device 1400 or both front and back cameras, flashes and flash filter panels may be provided. As shown, device 1400 may include flash filter panel 102. Device 1400 may include any flash filter panel discussed herein such as grayscale flash filter panel 302 or color flash filter panel 402 or the like. Camera 1405 and flash 1410 may be components of a camera module to originate image data that is output to display 1404, processed as discussed herein, and/or communicated remotely from device 1400 via antenna 1408 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one or more first embodiments, a method for providing spatially adjusted flash exposures for an imaging device comprises determining flash filter panel control parameters based on image data associated with a scene, adjusting a transparency of a region of a flash filter panel adjacent to a flash module of the imaging device based on the flash filter panel control parameters, and exposing the scene by providing a flash light from the flash module and through the flash filter panel to generate captured image data.

Further to the first embodiments, determining the flash filter panel control parameters comprises obtaining the image data during a pre-flash exposure of the scene, determining a first brightness of a first subject of the scene and a second brightness of a second subject of the scene based on the image data, wherein the first subject of the scene is associated with the region of the flash filter panel and the second subject of the scene is associated with a second region of the flash filter panel, and generating a transparency parameter for the region of the flash filter panel based on the first brightness and the second brightness.

Further to the first embodiments, determining the flash filter panel control parameters comprises obtaining the image data during a pre-flash exposure of the scene, determining a first brightness of a first subject of the scene and a second brightness of a second subject of the scene based on the image data, wherein the first subject of the scene is associated with the region of the flash filter panel and the second subject of the scene is associated with a second region of the flash filter panel, and generating a transparency parameter for the region of the flash filter panel based on the first brightness and the second brightness, and the transparency parameter comprises a ratio of the second brightness to the first brightness.

Further to the first embodiments, determining the flash filter panel control parameters comprises obtaining the image data during a pre-flash exposure of the scene, determining a first brightness of a first subject of the scene and a second brightness of a second subject of the scene based on the image data, wherein the first subject of the scene is associated with the region of the flash filter panel and the second subject of the scene is associated with a second region of the flash filter panel, and generating a transparency parameter for the region of the flash filter panel based on the first brightness and the second brightness, and every region of the flash filter panel is set to full transparency during the pre-flash exposure of the scene.

Further to the first embodiments, determining the flash filter panel control parameters comprises determining a first subject distance associated with the region of the flash filter panel and a second subject distance associated with a second region of the flash filter panel.

Further to the first embodiments, determining the flash filter panel control parameters comprises determining a first subject distance associated with the region of the flash filter panel and a second subject distance associated with a second region of the flash filter panel, wherein the second subject distance is greater than the first subject distance, and wherein the flash filter panel control parameters indicate full transparency for the second region of the flash filter panel and a reduced transparency for the region of the flash filter panel.

Further to the first embodiments, determining the flash filter panel control parameters comprises determining a first subject distance associated with the region of the flash filter panel and a second subject distance associated with a second region of the flash filter panel, wherein the second subject distance is greater than the first subject distance, wherein the flash filter panel control parameters indicate full transparency for the second region of the flash filter panel and a reduced transparency for the region of the flash filter panel, and wherein the reduced transparency comprises the full transparency multiplied by a square of a ratio of the first distance to the second distance.

Further to the first embodiments, determining the flash filter panel control parameters comprises determining a first subject distance associated with the region of the flash filter panel and a second subject distance associated with a second region of the flash filter panel, wherein the second subject distance is greater than the first subject distance, wherein the flash filter panel control parameters indicate full transparency for the second region of the flash filter panel and a reduced transparency for the region of the flash filter panel, and wherein the reduced transparency comprises the full transparency multiplied by a square of a ratio of the first distance to the second distance.

Further to the first embodiments, determining the flash filter panel control parameters comprises determining a first subject distance associated with the region of the flash filter panel and a second subject distance associated with a second region of the flash filter panel and the image data comprises a depth map associated with the scene.

Further to the first embodiments, the flash filter panel comprises a color flash filter panel and adjusting the transparency of the region comprises adjusting a color transparency of the region.

Further to the first embodiments, the flash filter panel comprises a color flash filter panel and adjusting the transparency of the region comprises adjusting a color transparency of the region, wherein the region is associated with a skin region of the scene and wherein adjusting the color transparency of the region comprises providing a red color tint for the first region.

Further to the first embodiments, the flash filter panel comprises a color flash filter panel and adjusting the transparency of the region comprises adjusting a color transparency of the region, wherein adjusting the color transparency of the region comprises adjusting the color transparency to compensate for an ambient light source color difference between a first ambient illumination source provided to a first subject associated with the region of the flash filter panel and a second ambient illumination source provided to a second subject associated with a second region of the flash filter panel.

Further to the first embodiments, the flash filter panel comprises a color flash filter panel and adjusting the transparency of the region comprises adjusting a color transparency of the region, wherein the flash module comprises a light-emitting diode flash and wherein adjusting the color transparency of the region comprises providing a red color tint for the region.

Further to the first embodiments, the flash filter panel comprises a color flash filter panel and adjusting the transparency of the region comprises adjusting a color transparency of the region, wherein the region is associated with a skin region of the scene and wherein adjusting the color transparency of the region comprises providing a red color tint for the first region or wherein adjusting the color transparency of the region comprises adjusting the color transparency to compensate for an ambient light source color difference between a first ambient illumination source provided to a first subject associated with the region of the flash filter panel and a second ambient illumination source provided to a second subject associated with a second region of the flash filter panel or wherein the flash module comprises a light-emitting diode flash and wherein adjusting the color transparency of the region comprises providing a red color tint for the region.

In one or more second embodiments, a spatial flash exposure adjustment system comprises a flash filter panel comprising a plurality of transparency adjustable regions, wherein the flash filter panel is configured to be mounted adjacent to a flash module and a controller coupled to the flash filter panel, the controller to adjust transparencies of the transparency adjustable regions of the flash filter panel based on flash filter panel control parameters.

Further to the second embodiments, the flash filter panel comprises a grayscale liquid-crystal display panel having not less than 20 transparency adjustable regions.

Further to the second embodiments, the flash filter panel comprises a color liquid-crystal display panel and the regions comprise pixels having red sub-pixels, green sub-pixels, and blue sub-pixels.

Further to the second embodiments, the system further comprises a flash module lens and the flash module, wherein the flash filter panel is disposed between the flash module and the flash module lens.

Further to the second embodiments, the system further comprises a cover lens mounted to the flash filter panel, wherein the flash filter panel and the cover lens are configured to be mounted immediately adjacent to a flash module lens that is immediately adjacent to the flash module.

Further to the second embodiments, the system further comprises an image processor to generate the flash filter panel control parameters based on image data associated with a scene.

Further to the second embodiments, the system further comprises an image processor to generate the flash filter panel control parameters based on image data associated with a scene, wherein the image data comprises at least one of depth data or luminance data, a camera module comprising an image sensor to obtain captured image data of the scene, and the flash module, wherein the system comprises at least one of a camera, a smartphone, an ultrabook, a laptop, or a tablet.

Further to the second embodiments, the system further comprises a camera module comprising an image sensor to obtain image data during a pre-flash exposure of the scene and an image processor to determine a first brightness of a first subject of the scene and a second brightness of a second subject of the scene based on the image data, wherein the first subject of the scene is associated with a region of the flash filter panel and the second subject of the scene is associated with a second region of the flash filter panel and to generate a transparency parameter for the region of the flash filter panel based on the first brightness and the second brightness.

Further to the second embodiments, the system further comprises a camera module comprising an image sensor to obtain image data during a pre-flash exposure of the scene and an image processor to determine a first brightness of a first subject of the scene and a second brightness of a second subject of the scene based on the image data, wherein the first subject of the scene is associated with a region of the flash filter panel and the second subject of the scene is associated with a second region of the flash filter panel and to generate a transparency parameter for the region of the flash filter panel based on the first brightness and the second brightness, and wherein the transparency parameter comprises a ratio of the second brightness to the first brightness.

Further to the second embodiments, the system further comprises an image processor to determine a first subject distance associated with a region of the flash filter panel and a second subject distance associated with a second region of the flash filter panel, wherein the second subject distance is greater than the first subject distance, and wherein the flash filter panel control parameters indicate full transparency for the second region of the flash filter panel and a reduced transparency for the region of the flash filter panel.

Further to the second embodiments, an image processor to determine a first subject distance associated with a region of the flash filter panel and a second subject distance associated with a second region of the flash filter panel, wherein the second subject distance is greater than the first subject distance, and wherein the flash filter panel control parameters indicate full transparency for the second region of the flash filter panel and a reduced transparency for the region of the flash filter panel, and wherein the reduced transparency comprises the full transparency multiplied by a square of a ratio of the first distance to the second distance.

In one or more third embodiments, a spatial flash exposure adjustment system comprises means for determining flash filter panel control parameters based on image data associated with a scene, means for adjusting a transparency of a region of a flash filter panel adjacent to a flash module of the imaging device based on the flash filter panel control parameters, and means for exposing the scene by providing a flash light from the flash module and through the flash filter panel to generate captured image data.

Further to the third embodiments, the means for determining the flash filter panel control parameters comprise means for obtaining the image data during a pre-flash exposure of the scene, means for determining a first brightness of a first subject of the scene and a second brightness of a second subject of the scene based on the image data, wherein the first subject of the scene is associated with the region of the flash filter panel and the second subject of the scene is associated with a second region of the flash filter panel, and means for generating a transparency parameter for the region of the flash filter panel based on the first brightness and the second brightness.

Further to the third embodiments, the means for determining the flash filter panel control parameters comprise means for obtaining the image data during a pre-flash exposure of the scene, means for determining a first brightness of a first subject of the scene and a second brightness of a second subject of the scene based on the image data, wherein the first subject of the scene is associated with the region of the flash filter panel and the second subject of the scene is associated with a second region of the flash filter panel, and means for generating a transparency parameter for the region of the flash filter panel based on the first brightness and the second brightness, wherein the transparency parameter comprises a ratio of the second brightness to the first brightness.

Further to the third embodiments, the means for determining the flash filter panel control parameters comprise means for obtaining the image data during a pre-flash exposure of the scene, means for determining a first brightness of a first subject of the scene and a second brightness of a second subject of the scene based on the image data, wherein the first subject of the scene is associated with the region of the flash filter panel and the second subject of the scene is associated with a second region of the flash filter panel, and means for generating a transparency parameter for the region of the flash filter panel based on the first brightness and the second brightness, wherein every region of the flash filter panel is set to full transparency during the pre-flash exposure of the scene.

Further to the third embodiments, the means for determining the flash filter panel control parameters comprise means for determining a first subject distance associated with the region of the flash filter panel and a second subject distance associated with a second region of the flash filter panel.

Further to the third embodiments, the means for determining the flash filter panel control parameters comprise means for determining a first subject distance associated with the region of the flash filter panel and a second subject distance associated with a second region of the flash filter panel, wherein the second subject distance is greater than the first subject distance, and wherein the flash filter panel control parameters indicate full transparency for the second region of the flash filter panel and a reduced transparency for the region of the flash filter panel.

Further to the third embodiments, the means for determining the flash filter panel control parameters comprise means for determining a first subject distance associated with the region of the flash filter panel and a second subject distance associated with a second region of the flash filter panel, wherein the second subject distance is greater than the first subject distance, wherein the flash filter panel control parameters indicate full transparency for the second region of the flash filter panel and a reduced transparency for the region of the flash filter panel, and wherein the reduced transparency comprises the full transparency multiplied by a square of a ratio of the first distance to the second distance.

Further to the third embodiments, the means for determining the flash filter panel control parameters comprise means for determining a first subject distance associated with the region of the flash filter panel and a second subject distance associated with a second region of the flash filter panel, wherein the image data comprises a depth map associated with the scene.

Further to the third embodiments, the flash filter panel comprises a color flash filter panel and wherein the means for adjusting the transparency of the region comprise means for adjusting a color transparency of the region.

Further to the third embodiments, the flash filter panel comprises a color flash filter panel and wherein the means for adjusting the transparency of the region comprise means for adjusting a color transparency of the region, wherein the region is associated with a skin region of the scene and wherein the means for adjusting the color transparency of the region comprise means for providing a red color tint for the first region.

Further to the third embodiments, the flash filter panel comprises a color flash filter panel and wherein the means for adjusting the transparency of the region comprise means for adjusting a color transparency of the region, wherein the means for adjusting the color transparency of the region comprise means for adjusting the color transparency to compensate for an ambient light source color difference between a first ambient illumination source provided to a first subject associated with the region of the flash filter panel and a second ambient illumination source provided to a second subject associated with a second region of the flash filter panel.

Further to the third embodiments, the flash filter panel comprises a color flash filter panel and wherein the means for adjusting the transparency of the region comprise means for adjusting a color transparency of the region, wherein the flash module comprises a light-emitting diode flash and wherein the means for adjusting the color transparency of the region comprise means for providing a red color tint for the region.

In one or more fourth embodiments, at least one machine readable medium comprises a plurality of instructions that in response to being executed on an imaging device, cause the imaging device to spatially adjusted flash exposures by determining flash filter panel control parameters based on image data associated with a scene, adjusting a transparency of a region of a flash filter panel adjacent to a flash module of the imaging device based on the flash filter panel control parameters, and exposing the scene by providing a flash light from the flash module and through the flash filter panel to generate captured image data.

Further to the fourth embodiments, determining the flash filter panel control parameters comprises obtaining the image data during a pre-flash exposure of the scene, determining a first brightness of a first subject of the scene and a second brightness of a second subject of the scene based on the image data, wherein the first subject of the scene is associated with the region of the flash filter panel and the second subject of the scene is associated with a second region of the flash filter panel, and generating a transparency parameter for the region of the flash filter panel based on the first brightness and the second brightness.

Further to the fourth embodiments, determining the flash filter panel control parameters comprises obtaining the image data during a pre-flash exposure of the scene, determining a first brightness of a first subject of the scene and a second brightness of a second subject of the scene based on the image data, wherein the first subject of the scene is associated with the region of the flash filter panel and the second subject of the scene is associated with a second region of the flash filter panel, and generating a transparency parameter for the region of the flash filter panel based on the first brightness and the second brightness, wherein the transparency parameter comprises a ratio of the second brightness to the first brightness.

Further to the fourth embodiments, determining the flash filter panel control parameters comprises determining a first subject distance associated with the region of the flash filter panel and a second subject distance associated with a second region of the flash filter panel.

Further to the fourth embodiments, the second subject distance is greater than the first subject distance and the flash filter panel control parameters indicate full transparency for the second region of the flash filter panel and a reduced transparency for the region of the flash filter panel.

Further to the fourth embodiments, the flash filter panel comprises a color flash filter panel and adjusting the transparency of the region comprises adjusting a color transparency of the region.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A method for providing spatially adjusted flash exposures for an imaging device comprising:
   determining flash filter panel control parameters based on image data associated with a scene comprising:
      obtaining the image data during a pre-flash exposure of the scene,
      determining a first brightness of a first subject of the scene and a second brightness of a second subject of the scene based on the image data, wherein the first subject of the scene is associated with the region of the flash filter panel and the second subject of the scene is associated with a second region of the flash filter panel, and
      generating a transparency parameter for the region of the flash filter panel based on the first brightness and the second brightness, wherein the transparency parameter comprises a ratio of the second brightness to the first brightness;
   adjusting a transparency of a region of a flash filter panel adjacent to a flash module of the imaging device based on the flash filter panel control parameters; and
   exposing the scene by providing a flash light from the flash module and through the flash filter panel to generate captured image data.

2. The method of claim 1, wherein every region of the flash filter panel is set to full transparency during the pre-flash exposure of the scene.

3. The method of claim 1, wherein determining the flash filter panel control parameters comprises determining a first subject distance associated with the region of the flash filter panel and a second subject distance associated with a second region of the flash filter panel.

4. The method of claim 3, wherein the second subject distance is greater than the first subject distance, and wherein the flash filter panel control parameters indicate full transparency for the second region of the flash filter panel and a reduced transparency for the region of the flash filter panel.

5. The method of claim 4, wherein the reduced transparency comprises the full transparency multiplied by a square of a ratio of the first distance to the second distance.

6. The method of claim 3, wherein the image data comprises a depth map associated with the scene.

7. The method of claim 1, wherein the flash filter panel comprises a color flash filter panel and wherein adjusting the transparency of the region comprises adjusting a color transparency of the region.

8. The method of claim 7, wherein the region is associated with a skin region of the scene and wherein adjusting the color transparency of the region comprises providing a red color tint for the region.

9. The method of claim 7, wherein adjusting the color transparency of the region comprises adjusting the color transparency to compensate for an ambient light source color difference between a first ambient illumination source provided to a first subject associated with the region of the flash filter panel and a second ambient illumination source provided to a second subject associated with a another region of the flash filter panel.

10. The method of claim 7, wherein the flash module comprises a light-emitting diode flash and wherein adjusting the color transparency of the region comprises providing a red color tint for the region.

11. A spatial flash exposure adjustment system comprising:
   a flash filter panel comprising a plurality of transparency adjustable regions, wherein the flash filter panel is configured to be mounted adjacent to a flash module; and
   a controller coupled to the flash filter panel, the controller to adjust transparencies of the transparency adjustable regions of the flash filter panel based on flash filter panel control parameters and to operate by:
      obtaining the image data during a pre-flash exposure of the scene,
      determining a first brightness of a first subject of the scene and a second brightness of a second subject of the scene based on the image data, wherein the first subject of the scene is associated with the region of the flash filter panel and the second subject of the scene is associated with a second region of the flash filter panel, and
      generating a transparency parameter for the region of the flash filter panel based on the first brightness and the second brightness, wherein the transparency parameter comprises a ratio of the second brightness to the first brightness.

12. The system of claim 11, wherein the flash filter panel comprises a grayscale liquid-crystal display panel having not less than 20 transparency adjustable regions.

13. The system of claim 11, wherein the flash filter panel comprises a color liquid-crystal display panel and the regions comprise pixels having red sub-pixels, green sub-pixels, and blue sub-pixels.

14. The system of claim 11, further comprising:
   a flash module lens and the flash module, wherein the flash filter panel is disposed between the flash module and the flash module lens.

15. The system of claim 11, further comprising:
   a cover lens mounted to the flash filter panel, wherein the flash filter panel and the cover lens are configured to be mounted immediately adjacent to a flash module lens that is immediately adjacent to the flash module.

16. The system of claim 11, further comprising:
   an image processor to generate the flash filter panel control parameters based on image data associated with a scene.

17. The system of claim 11, further comprising:
   an image processor to generate the flash filter panel control parameters based on image data associated with a scene;
   a camera module comprising an image sensor to obtain captured image data of the scene; and the flash module, wherein the system comprises at least one of a camera, a smartphone, an ultrabook, a laptop, or a tablet.

18. At least one non-transitory machine readable medium comprising a plurality of instructions that in response to being executed on an imaging device, cause the imaging device to spatially adjust flash exposures by:
  determining flash filter panel control parameters based on image data associated with a scene and comprising:
    obtaining the image data during a pre-flash exposure of the scene,
    determining a first brightness of a first subject of the scene and a second brightness of a second subject of the scene based on the image data, wherein the first subject of the scene is associated with the region of the flash filter panel and the second subject of the scene is associated with a second region of the flash filter panel, and
    generating a transparency parameter for the region of the flash filter panel based on the first brightness and the second brightness, wherein the transparency parameter comprises a ratio of the second brightness to the first brightness;
  adjusting a transparency of a region of a flash filter panel adjacent to a flash module of the imaging device based on the flash filter panel control parameters; and
  exposing the scene by providing a flash light from the flash module and through the flash filter panel to generate captured image data.

19. The machine readable medium of claim 18, wherein determining the flash filter panel control parameters comprises determining a first subject distance associated with the region of the flash filter panel and a second subject distance associated with a second region of the flash filter panel.

20. The machine readable medium of claim 18, wherein the second subject distance is greater than the first subject distance, and wherein the flash filter panel control parameters indicate full transparency for the second region of the flash filter panel and a reduced transparency for the region of the flash filter panel.

21. The machine readable medium of claim 18, wherein the flash filter panel comprises a color flash filter panel and wherein adjusting the transparency of the region comprises adjusting a color transparency of the region.

* * * * *